(12) United States Patent
Volk et al.

(10) Patent No.: US 7,720,686 B2
(45) Date of Patent: May 18, 2010

(54) METHOD AND SYSTEM FOR PROVIDING LISTENER-REQUESTED MUSIC OVER A NETWORK

(75) Inventors: Andrew R. Volk, San Francisco, CA (US); Erik Reed, Dublin, CA (US)

(73) Assignee: Yahoo! Inc., Sunnyvale, CA (US)

( * ) Notice: Subject to any disclaimer, the term of this patent is extended or adjusted under 35 U.S.C. 154(b) by 989 days.

(21) Appl. No.: 10/416,478

(22) PCT Filed: Dec. 4, 2002

(86) PCT No.: PCT/US02/38800

§ 371 (c)(1),
(2), (4) Date: May 9, 2003

(87) PCT Pub. No.: WO03/048948

PCT Pub. Date: Jun. 12, 2003

(65) Prior Publication Data

US 2004/0019497 A1    Jan. 29, 2004

Related U.S. Application Data

(60) Provisional application No. 60/337,120, filed on Dec. 4, 2001.

(51) Int. Cl.
*G06Q 10/00* (2006.01)
*G06F 17/00* (2006.01)
*G06F 15/16* (2006.01)

(52) U.S. Cl. .............................. 705/1; 700/94; 709/219

(58) Field of Classification Search ................ 705/1; 709/219
See application file for complete search history.

(56) References Cited

U.S. PATENT DOCUMENTS 6,009,410 A * 12/1999 LeMole et al. ........... 705/14.54

(Continued)

FOREIGN PATENT DOCUMENTS

GB    2361612 A    10/2001

(Continued)

OTHER PUBLICATIONS

French, J., and Hauver, D., "Flycasting: On the Fly Broadcasting," Proceedings of the 2nd DELOS Network of Excellence Workshop on Personalization and Recommender Systems in Digital Libraries, DELOS Nov. 2001.*

(Continued)

*Primary Examiner*—John W Hayes
*Assistant Examiner*—Tonya Joseph
(74) *Attorney, Agent, or Firm*—James J. DeCarlo; Greenberg Traurig, LLP

(57) ABSTRACT

A system and method for providing personalized music playback over a network. Via a browser, a user computer may be connected to a server and the user may tune to one of a plurality of radio stations. The user may receive a playlist of songs in the musical style of the radio station selected by the user. The playlist includes a plurality of unique identifiers for each song that indicate a location on the Internet from which the song may be streamingly transmitted to a media player for playback on the user's computer. Additionally, each user may submit requests for songs which that user desires to be included on a future playlist. For each radio station, requests from a plurality of users are aggregated over a predetermined time period to determine which songs are most requested. A user request for a song may be time-delayed or satisfied in real-time.

51 Claims, 21 Drawing Sheets

U.S. PATENT DOCUMENTS

| | | | | |
|---|---|---|---|---|
| 6,064,379 | A | * | 5/2000 | DeMoney ................ 715/500.1 |
| 6,248,946 | B1 | | 6/2001 | Dwek |
| 6,249,810 | B1 | | 6/2001 | Kiraly |
| 6,615,039 | B1 | | 9/2003 | Eldering |
| 6,963,899 | B1 | | 11/2005 | Fernandez et al. |
| 6,965,770 | B2 | * | 11/2005 | Walsh et al. ............ 455/426.1 |
| 7,010,537 | B2 | | 3/2006 | Eyal et al. |
| 2001/0003828 | A1 | * | 6/2001 | Peterson et al. ............ 709/219 |
| 2001/0014876 | A1 | * | 8/2001 | Miyashita ................... 705/37 |
| 2001/0025259 | A1 | * | 9/2001 | Rouchon ..................... 705/26 |
| 2001/0053944 | A1 | * | 12/2001 | Marks et al. .................. 700/94 |
| 2002/0019858 | A1 | * | 2/2002 | Kaiser et al. ............... 709/219 |
| 2002/0026499 | A1 | | 2/2002 | Cantone et al. |
| 2002/0049717 | A1 | | 4/2002 | Routennberg et al. |
| 2002/0077988 | A1 | * | 6/2002 | Sasaki et al. .................. 705/59 |
| 2002/0124050 | A1 | * | 9/2002 | Middeljans ................ 709/203 |
| 2002/0157034 | A1 | * | 10/2002 | Sagar ............................ 714/4 |
| 2003/0046399 | A1 | | 3/2003 | Boulter et al. |
| 2003/0074422 | A1 | * | 4/2003 | Montemurro et al. ....... 709/219 |
| 2005/0216942 | A1 | | 9/2005 | Barton |

FOREIGN PATENT DOCUMENTS

| | | |
|---|---|---|
| WO | WO 01/35667 | 5/2001 |
| WO | WO 02/17099 A1 | 2/2002 |

OTHER PUBLICATIONS

Pub. No.: US 2002/0002541 A1; Pub. Date: Jan. 3, 2002; Online Digital Content Library; Inventor: Eddie H. Williams.

Bill Konig, "The College Music Journal names TuneTo.com, CMJ Website of the Week", http://web.archive.org/web/20000412122646/www.tuneto.com/company/news/cmj120899.html, Apr. 12, 2000.

Business Wire, "Former WebRadio.Com Executive to Lead TuneTo. com's Strategic Partnership Development with the Music Industry, http://findarticles.com/p/article/mi_m0EIN/is_1999_Oct_19/ai_56527957", Oct. 19, 1999.

Business Wire, "Spin Records.com Announces Launch of Internet Music Made Easy", "http://findarcticles.com/p/articles/mi_m0EIN/is_2000_April_6/ai_613343598", Apr. 6, 2000.

Business Wire, Top Execs From Microsoft & RealNetworks to Keynote Kagan Streaming Media Conference Oct. 6-7 in New York, "http://findarcticles.com/p/articles/mi_m0EIN/is_1999_Oct_4/ai_55968610", Oct 4, 1999.

Shands, Mark, "An Exclusive Interview with Michael Weiss, TuneTo. com", http:// web.archive.org/web/20000414081433/www.hitmakers.com/archivedfeats/weiss.html, Apr. 14, 2000.

Alvear, Jose, "Q&A with Tim Bratton, President of TuneTo.com", http://web.archive.org/web/20000417161149/www.tuneto.com/company/news/smn112399.html:, Nov. 23,1999.

Mark Smotroff, "TuneTo.com Seals $2.6 Million Series A Funding", http://web.archive.org/web/20000606181901/www.tuneto.com/company/news/pr011800.html, Jan. 18, 2000.

Dennis Michael, "CNN Story on downloadable music and Internet radio includes Tim Bratton, President of TuneTo.com", http://web.archive.org/web/20000229210114/www.tuneto.com/company/news/cnn120299.html, Dec. 2, 1999.

* cited by examiner

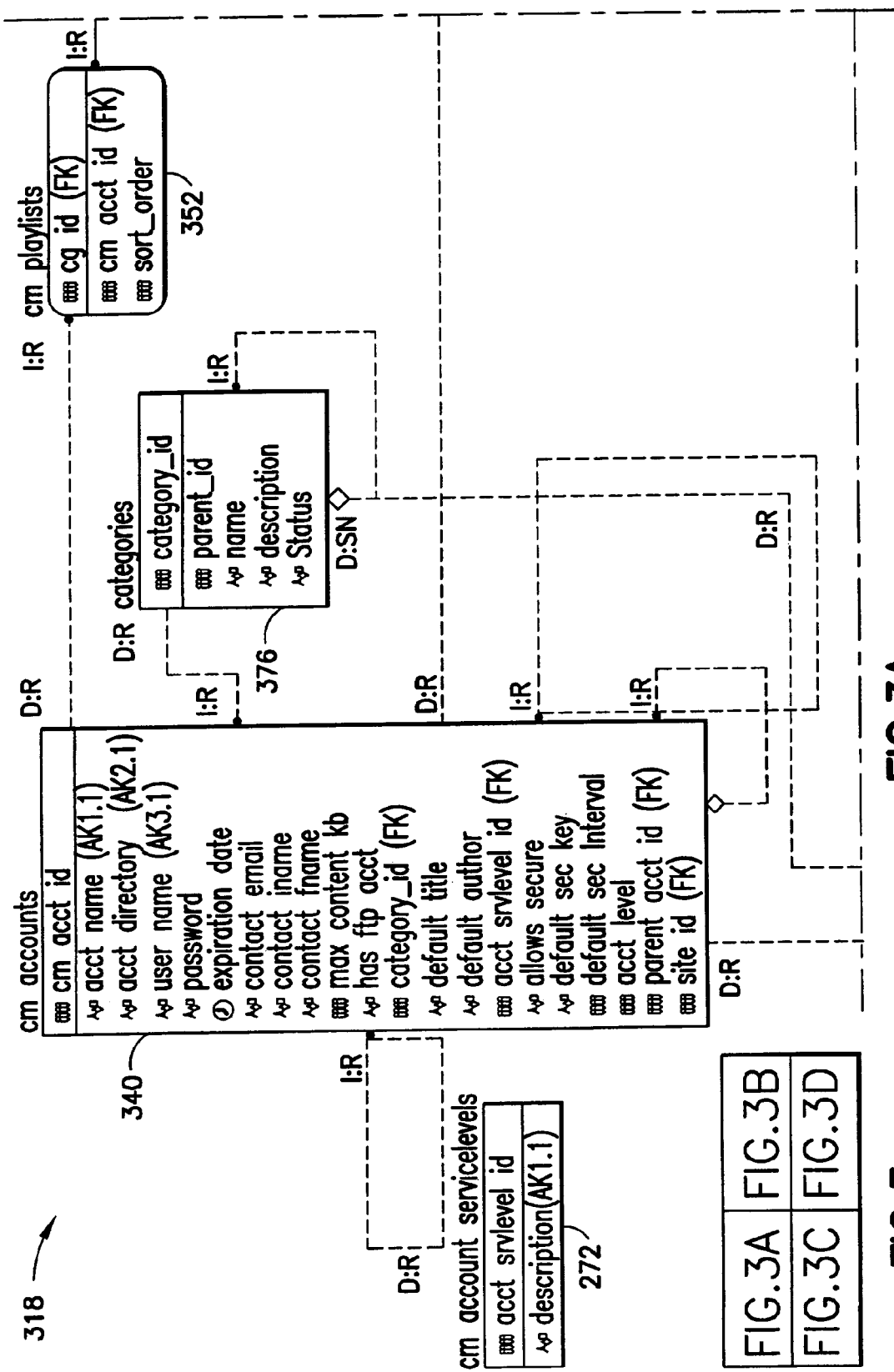

FIG. 4f ymusic_newuser_signup.html – Microsoft Internet Explorer

File   Edit   View   Favorites   Tools   Help

Yahoo! ID: [____] — 405
(examples: *llldide56* or *good*)

Password: [____] — 405

Re-type Password: [____] — 405

Choosing your ID
You will use this information to access Yahoo! each time. Capitalization matters for your password!

If you forget your password, we would identify you with this information.

Security Question: [select a question to answer ▼] — 407

Your Answer: [____] — 405

Birthday: [select one ▼] [____] (Month Day, Year) — 407, 405

Alternate Email: [____] — 405

Recalling your password
This is our only way to verify your identity. To protect your account, make sure your answer is memorable for you but hard for others to guess!

First Name: [____] 405 Last Name: [____] — 407

Language & Content: [English–United States ▼] — 407

Zip/Postal Code: [____] 405 Gender: [▼] — 407

Occupation: [select occupation ▼] — 407

Industry: [select industry ▼] — 407

Customizing Yahoo!
Yahoo! will try to provide more relevant content and advertising based on the information collected on this page and on the Yahoo! products and services you use.

☑ Contact me occasionally about special offers and Yahoo! features

Interests (optional):
☐ Entertainment     ☐ Business
☐ Home & Family    ☐ Computers & Technology
☐ Health           ☐ Personal Finance

— 402

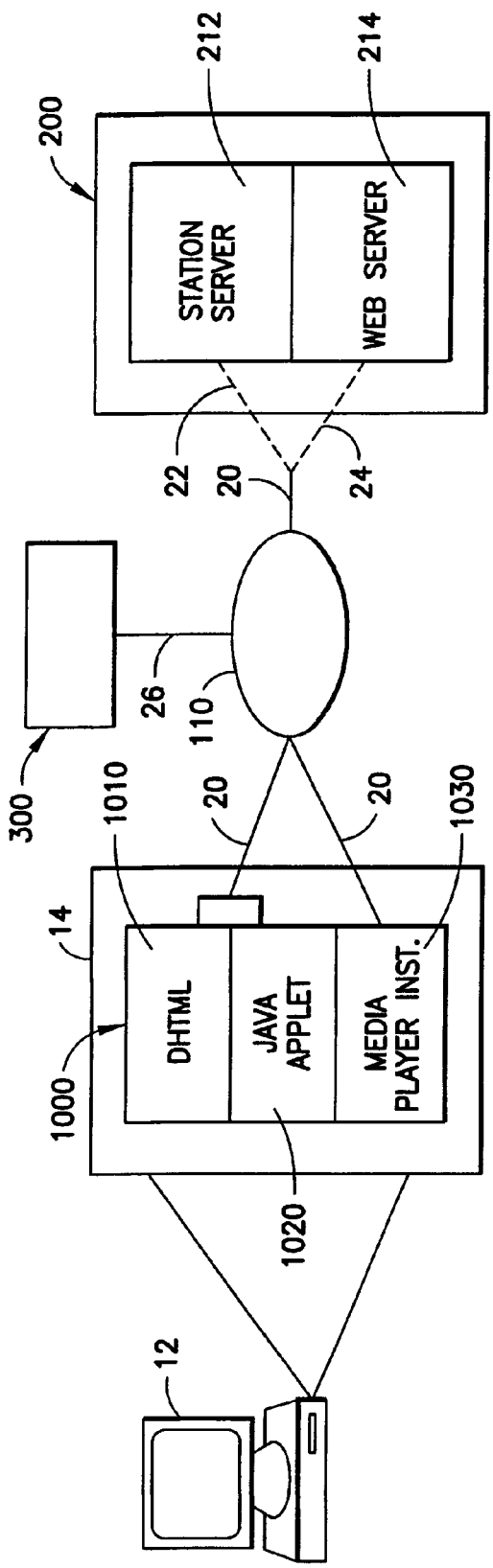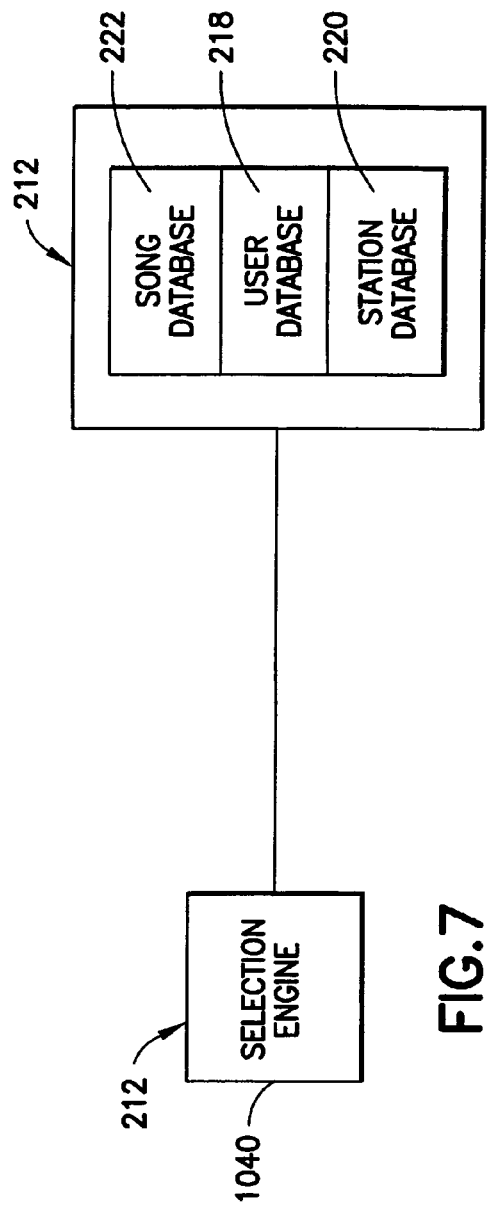

METHOD AND SYSTEM FOR PROVIDING LISTENER-REQUESTED MUSIC OVER A NETWORK

CROSS REFERENCE TO RELATED APPLICATIONS

This application claims the benefit under 35 U.S.C. §365 (c) of International Application No. PCT/US02/38800, filed Dec. 4, 2002, entitled Method And System For Providing Listener-Requested Music Over A Network, which claims the benefit of U.S. Provisional Application Ser. No. 60/337,120, filed Dec. 4, 2001, both of which are hereby incorporated herein by reference.

BACKGROUND OF THE INVENTION

1. Field of the Invention

This invention is directed to a method and system for providing listener-requested music over a network.

2. Background of the Invention

The Internet has advanced the state of personal and business communications and made access to virtually all types of information fast and simple. An Internet browser computer program (i.e., a browser) is typically all a user needs to communicate with other users over the Internet, and to locate and retrieve information from any of a plurality of Web sites. The browser may utilize certain other application programs to add functionality to the browser. For example, video and audio players may be used in connection with a browser to enable a user to receive and play back video and audio content.

Online radio stations enable a user to listen to the radio using their computer, with the computer operating in much the same manner as a typical radio. The user selects a radio station by causing the browser to navigate to a predetermined Internet address (i.e., url), and the music is either downloaded or streamed to the user's computer and audio player for playback. Radio playback, as just described, does not utilize the processing power of the user's computer to enhance the way music is provided and listened to over the Internet. The user's computer is essentially being used as a high-priced radio. A user may not request a song or alter the delivery of the audio content in any way. Other than selecting a radio station because of the type of music that station plays, the user has no control over the selection of the music content available over the Internet via an on-line radio station.

As the processing power of the computer increases, and as computer and Internet users become more sophisticated and demanding in terms of the type of content available and the manner in which that content is deliverable to and usable (viewed, listened to, etc.) by the user, new methods, devices, and systems for content delivery and playback are necessary. It is thus desirable to provide a method and system for providing music over a network that provides maximal flexibility to the user and utilizes the processing power of the user's computer.

SUMMARY OF THE INVENTION

The present invention is directed to a system and method for providing personalized music playback over a network. In accordance with embodiments of the present invention, a user may cause a browser on his/her computer to connect to a server via which the user may tune to one of a plurality of radio stations by selecting a hypertext link for the desired radio station. After certain registration, login, and other administrative procedures are completed, the user may receive from the server a playlist of songs in the musical style of the radio station selected by the user. The playlist includes a plurality of unique identifiers for each song that indicate to the user's media player a location on the Internet from which the song may be streamingly transmitted to the media player for playback on the user's computer. In addition to selecting a radio station and receiving a playlist, each registered user may submit requests for songs which may be included on a future playlist. For each radio station, requests from a plurality of users are aggregated over a predetermined time period to determine which songs are most requested. Those songs may be included on a subsequent playlist. In that way, the most requested songs are played back and each user may contribute to the construction of a playlist. The most requested songs are played back more quickly, thus satisfying a greater number of users (i.e., listeners). A user request for a song is preferably not satisfied in real-time, but is time-delayed so that the server may collected the plurality of requests, determine which songs are most requested, construct a playlist, and transmit the playlist to the users tuned to the particular radio station. Alternatively, a user request may be satisfied in real-time, so that the user requested song and/or artist is immediately streamed to the user and played back immediately by the user's media player or upon completion of any song then being played back.

In accordance with the present invention, a plurality of online radio stations may be provided for various music genres or for various musical communities. When used in connection with the present invention, the term radio station is not intended to refer to the more traditional form of audio broadcast (e.g., AM, FM, on-line (Internet) radio, shortwave, etc.), but instead, refers to one of a plurality of predetermined musical genre or musical community available for selection or tuning by a user via a network such as the Internet, for example. A radio station may be defined by virtually any criteria of interest to a plurality of listeners such as, for example, musical style, time period (e.g., 60s, 70s, 80s, etc.), hobbies or interests (e.g., skateboarding, snowboarding, etc.), geography (e.g., New York City, Southern United States, California, etc.), by way of non-limiting example.

Each user's request is aggregated with requests of other users listening to the same radio station. After a predetermined time period, the aggregated requests from the plurality of users are used to build a playlist of the most requested songs and/or artists. The playlist is then transmitted to each of the plurality of users listening to the radio station, for receipt and playback by each user's media player. The playlist preferably comprises a plurality of unique identifiers for the requested songs, (e.g., a url or Internet addresses) at which the particular songs are stored and from which the songs may be streamingly transmitted to each of the users. Each user's media player steps through the playlist and streamingly receives, in an order determined by the playlist, each of the songs that makes up the playlist. Audio advertisements may also be identified in a playlist and streamed to a user in the same manner as a song, as just described. Thus, each of a plurality of users (or even a single user) listening to a radio station can request a song for playback. If enough requests for that song are received, that song becomes part of the playlist. Songs that do not receive a predetermined number of requests may not make a particular playlist.

When a user first connects to a radio station by selecting a hypertext link or otherwise causing his/her browser to navigate to a predetermined url or Internet address for the radio station, a playlist may already have been transmitted to other users listening to that radio station. The "new" user will also receive the then-current playlist, and will begin hearing the song currently being played back on that playlist. In other words, when new users connect to a radio station, they do not hear the playlist from its beginning. Rather, they hear the playlist beginning on the same song and at approximately the same point in that song as other users connected to that radio station and who have received the then-current playlist.

Each user's computer has certain general purpose software (e.g., operating system, etc.) and special purpose software installed thereon (e.g., browser software and media player software).

In accordance with embodiments of the present invention, a server or a plurality of servers, as a routine matter of design choice, having general purpose software and special purpose software installed thereon and operable in connection with a processor thereof, provide the functionality of the present invention, as described in more detail herein. The general purpose software may include, by way of non-limiting example, operating system software, database software, communication software, security software, and other types and categories of software that may be necessary or useful to enable the server to connect to the Internet and provide the functionality of a server, as is generally known to persons skilled in the art. The general purpose software just described is illustrative and non-limiting. It would be obvious to persons skilled in the art that other software may be provided on the server, as a routine matter of design choice.

Special purpose software is installed on one or more servers and is operable in connection with a processor thereof to provide certain functionality in accordance with embodiments of the present invention. In a preferred embodiment, the special purpose software provides station server functionality ("station server"), Web server functionality ("Web server"), and ad server functionality ("ad server").

As used herein, the term "content" generally refers to any information provided via a Web page, and may include, by way of example and not limitation, text, numeric, photo, video, graphics (still and animated), audio, music, combined audio and video, streaming media (video, audio, combined video and audio), any combination of the foregoing, and all other types of data that may be provided by a server to a client (or any other computer configuration) over any type of network.

As used herein, the terms "online radio" and "radio station" are intended to be given their broadest possible interpretations, and are not intended to be defined or limited by traditional concepts or definitions of the term radio. For example, online radio and radio station, as those terms are used herein, may included, by way of non-limiting example, any method, device or system that facilitates delivery of audio content (spoken, musical, etc.) over a network. Such audio content delivery may be request-based, where a user may request a song or songs for immediate or delayed playback. Such audio content delivery may also be streamed to the user without input from the user, or transmitted using other known or hereafter developed transmission methods and devices.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference numerals depict like elements throughout the several views:

FIGS. 4a-4m depict exemplary Web pages provided in accordance with embodiments of the present invention;

FIG. 6 is a block diagram of the user software provided in accordance with an embodiment of the present invention; and FIG. 7 is a block diagram depicting the relation between the selection engine and song database.

DETAILED DESCRIPTION OF THE PREFERRED EMBODIMENTS

The present invention is directed to a method and system for providing music over a network such as the Internet. A plurality of users, each preferably having a user computer, may connect to a radio station server via the Internet, tune to one of a plurality of radio stations, and request songs for playback via a media player on each user's computer. For each radio station, the radio station server receives the user requests, aggregates those requests over a predetermined time period, and builds a playlist of songs and/or artists according to a predetermined criteria or plurality of criteria. A playlist may also include one or more advertisements. That playlist is then transmitted to a media player installed on each user's computer. The media player steps through the playlist and transmits a request for each song on the playlist to a streaming server, which streams each requested song to each user's media. That process continues until the last song on the playlist is streamed by the streaming server and received by each user's media player. A new playlist may then be built, transmitted, and played back as just described.

Figure 1:
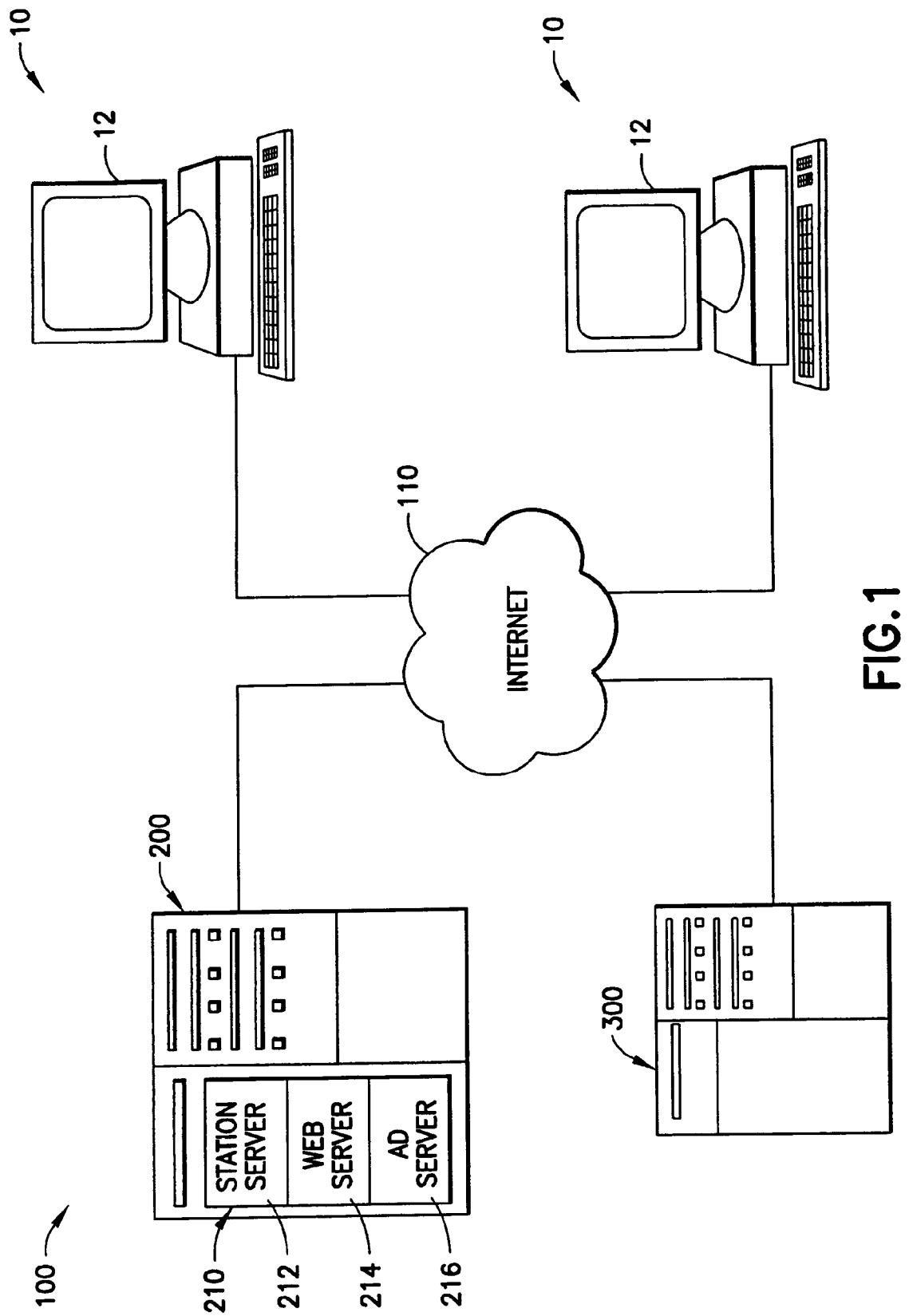
FIG. 1 is a schematic diagram of a network via which music may be provided to a user in accordance with an embodiment of the present invention.
Figure 2:
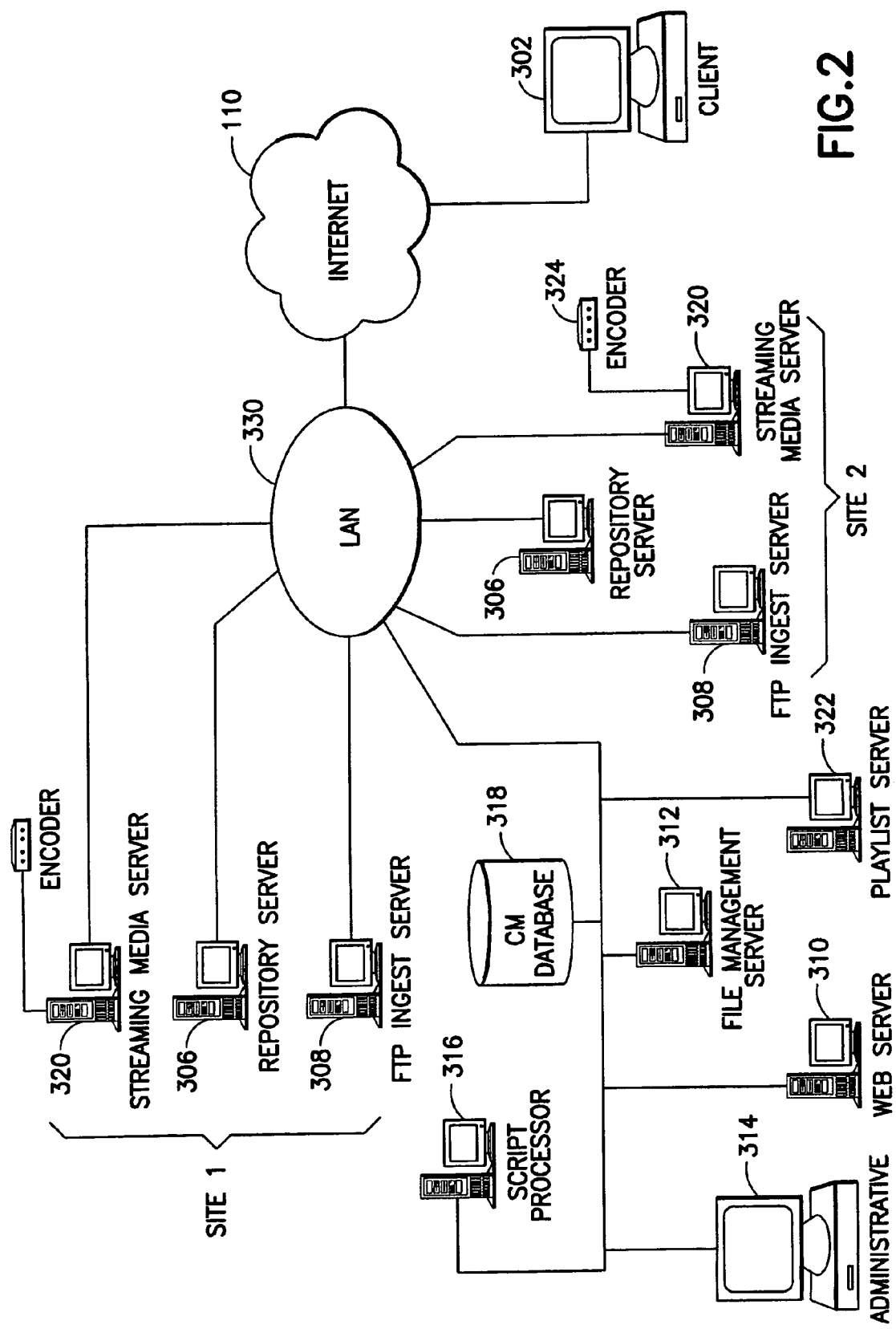
FIG. 2 is a schematic diagram of an embodiment of the content server depicted in FIG. 1.
Figure 3B:
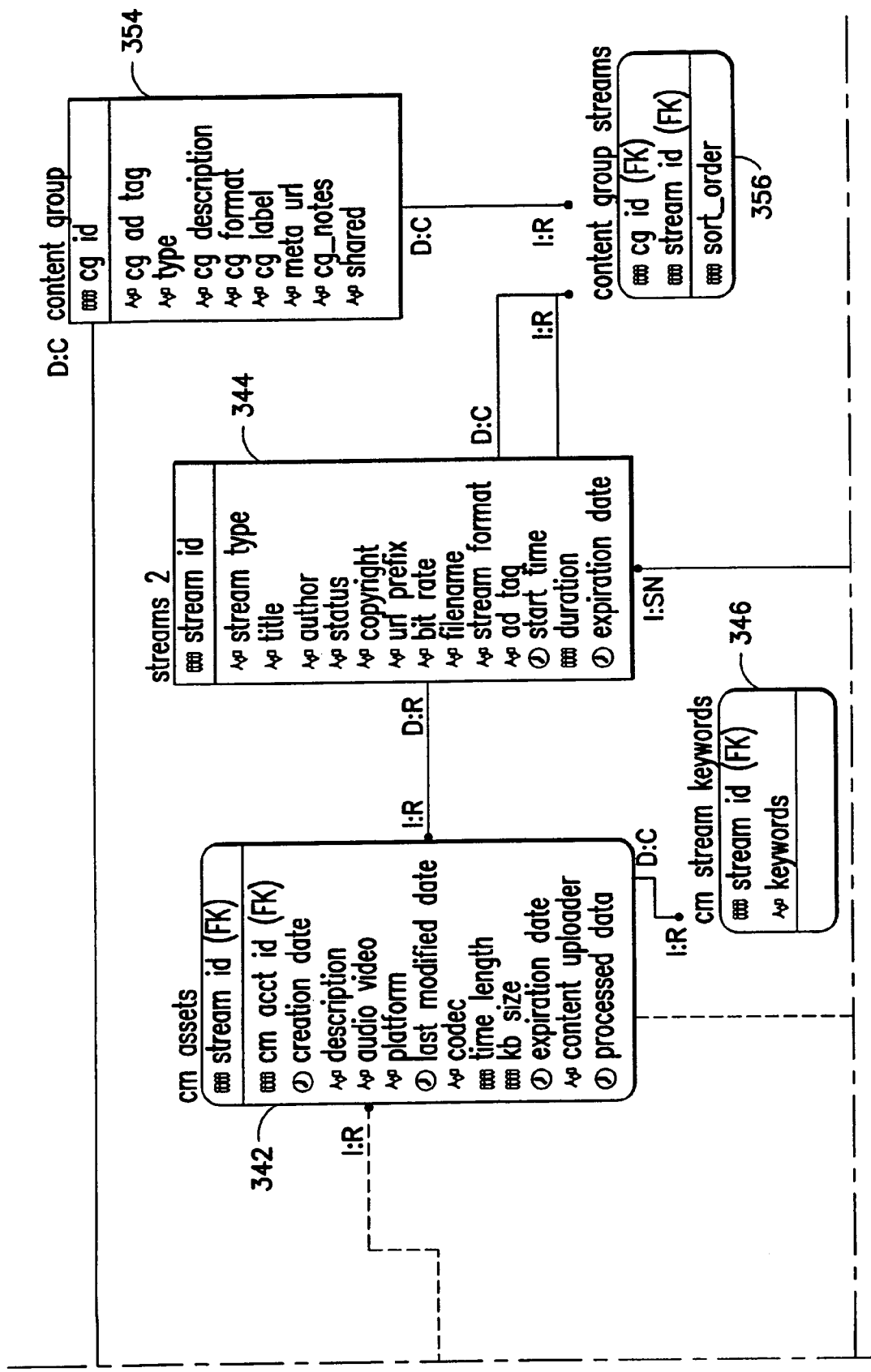
FIG. 3 is a schematic diagram of an illustrative content management database of the content server.
Figure 3C:
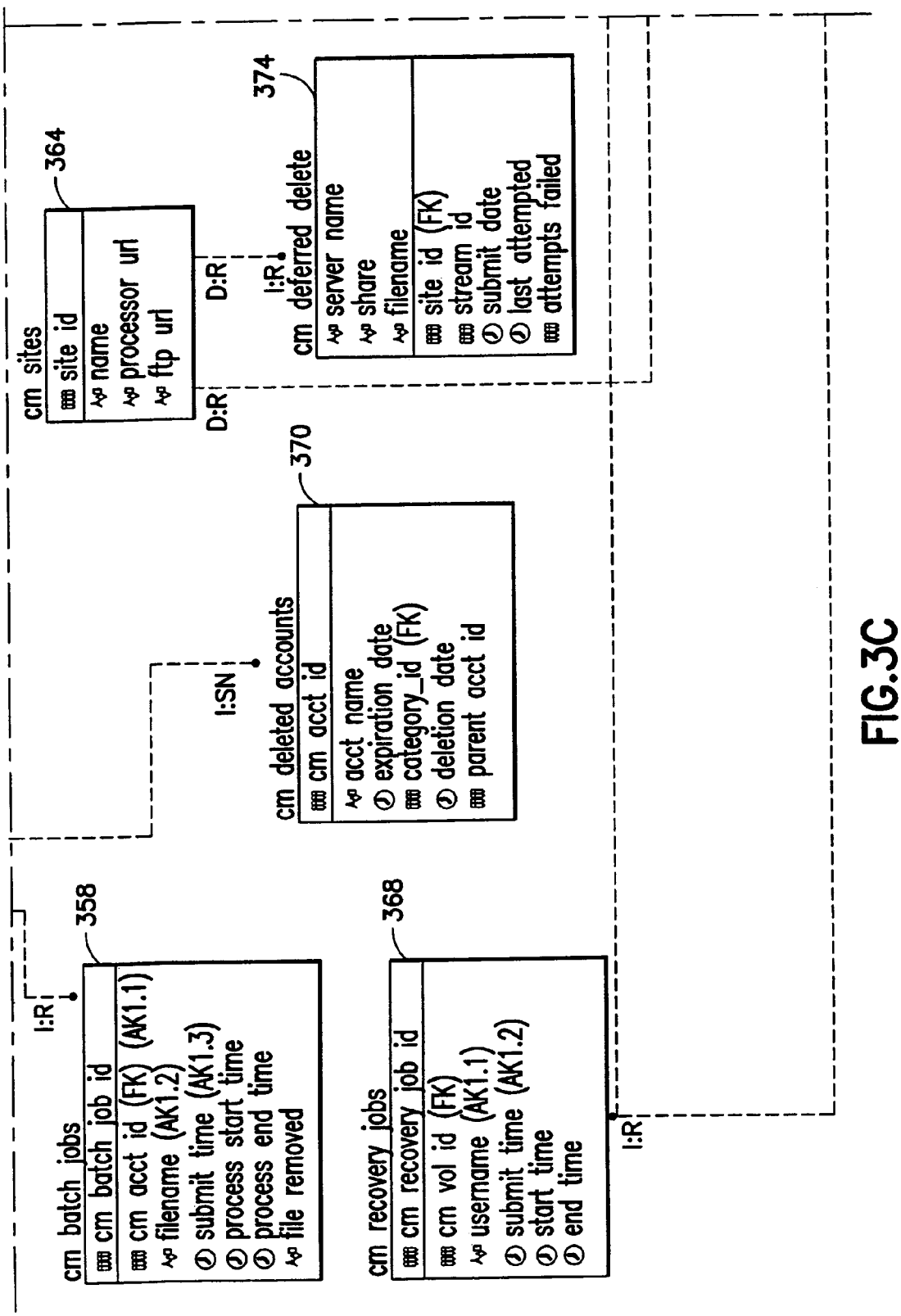
Figure 3D:
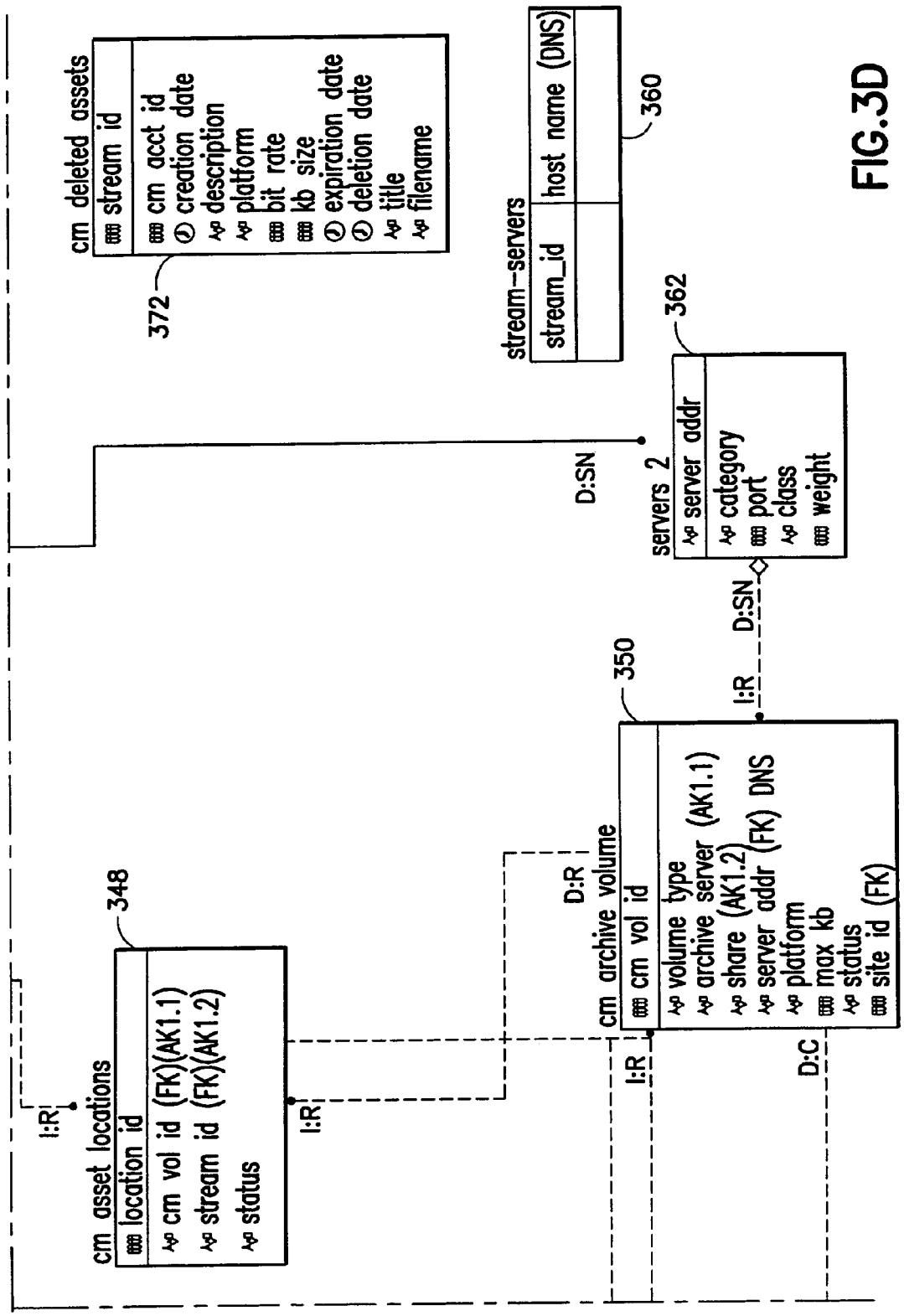

Referring now to the drawings, the various embodiments of the present invention will now be discussed in detail. With reference first to FIG. 1, a system 100 is depicted for providing listener-requested music over a network 110 (e.g., the Internet) to a plurality of users 10 each preferably having a user computer 12 having certain software installed thereon and operable in connection with a processor thereof, and that may be connected to the network 110. The system 100 includes a radio station server 200 that is connectable to the network 110. The radio station server 200 has a processor and software 210 operable in connection with the processor to provide Web server functionality 214 (e.g., transmittal of HTML, DHTML Web pages, serving content to a user, etc.), station server functionality 212, and ad server functionality 216; also respectively referred to herein as Web server, station sever and ad server. The system 100 also includes a content server 300 that is also connectable to the network 110. The content server 300 has a processor and software operable in connection with the processor for providing for the storage and retrieval of a plurality of songs at a plurality of unique and identifiable storage locations. The software of the content server 300 also provides streaming functionality to streamingly transmit a song to a user via the network 110. An exemplary embodiment of the content server 300 is depicted in FIGS. 2 and 3 and discussed in more detail below. Communication between and among the radio station server 200, content server 300, and plurality of client computers 12 is preferably via the network 110.

As used herein, the terms "computer" and "computing device" are intended to be construed broadly, and in a non-limiting manner, and to include, without limitation and by way of illustration only, any electronic device capable of receiving input, processing and storing data, and providing output (both input and output typically being digital data), and that is connectable in any manner and by any means to a network such as, for example, the Internet. A computer may be a computer of any style, size, and configuration including, without limitation, a server, workstation, desktop, laptop, Internet appliance, notebook, personal digital assistant (PDA), Internet enabled cellular phone, or other now known or hereafter developed device. A computer typically includes the following components: a central processing unit (CPU or processor) operable in connection with software (e.g., operating system, application programs, etc.), a hard-disk unit (HDU), permanent memory (e.g., ROM), temporary memory (e.g., RAM), a removable data storage device (e.g., CD-ROM, floppy drive, etc.), an input device (e.g., keyboard, mouse, trackball, etc.), an output device (e.g., monitor or display), and an I/O device (e.g., modem, infra-red transmitter/receiver, radio (cellular) transmitter receiver, etc.). It is known to a person skilled in the art that a computer may comprise some or all of those components, in addition to components not listed.

The terms "communicate" and "transmit" (and variations thereof) are used interchangeably herein to refer to the exchange of data (typically digital data) within a single computer (e.g., between and among any of a script, an application, a control, etc.), and/or to the uni-directional or bidirectional exchange of data (typically digital data) between one or more computers.

Each user computer 12 has various software installed thereon. For example, each user computer 12 has an Internet browser that facilitates connection by the user computer 12 to the network 110 and communication between the user computer 12 and other computing devices connected or connectable to the network 110 (e.g., servers, other user computers). Exemplary Internet browsers include the browser available from Netscape Communications Corporation under the trademark Netscape Navigator, or from Microsoft Corporation under the trademark Microsoft Explorer. Each user's computer 12 also requires media player software that facilitates receipt and playback of audio content. Exemplary media players include the media player available from Yahoo! Inc. under the trademark Yahoo! Player, RealNetworks Inc. under the trademark RealPlayer, Microsoft Corporation under the trademark Windows Media Player, and Liquid Audio, Inc. under the trademark Liquid Player. The various other hardware and software components of each user computer 12 are generally known to persons skilled in the art and need not be described in detail herein.

With continued reference to FIG. 1, the radio station server 200 is "located" at a predetermined Internet address and is identifiable by a unique url (e.g., theradioserver.com) has software 210 installed thereon and operable in connection with a processor thereof to provide certain functionality, namely, a Web server 214, a station server 212, and an ad server 216. The Web server 214 generally serves content to a user (i.e., to the user's browser), provides Web pages to users, facilitates new user registration and registered user login, user searches of available songs by various criteria (e.g., song title, artist, release date, etc.), and other Web server functionality described herein and as may be known to a person skilled in the art.

The station server 212, for each radio station, receives user requests for songs and/or artists from each of a plurality of users tuned to the radio station, aggregates the user requests over a predetermined time period, compiles a playlist based on certain predetermined criteria or plurality of criteria, and transmits the playlist to each of the plurality of users tuned to the radio station. The station server 212 also provides a plurality of databases, some of which may be accessed by the users (e.g., via the Web pages provided by the Web server), and some of which may not be accessed by the users. Exemplary databases include, by way of non-limiting example, a user-searchable song database 222, a user database 218, and a plurality of station databases 220, one for each station (depicted generally in FIG. 7). Alternatively, a single station database 220 may be provided that would be jointly utilized by the various stations. The song database 222 preferably comprises a plurality of unique identifiers (i.e., database entries) for a plurality of song that provides an electronic catalog of every song digitally available, i.e., not only the songs stored on the content server 300 (discussed in more detail below). The song database 222 may also include details on each song such as, for example, song title, artist, release date, recording label, and other information relating to each song that may be displayed while a song is being played back. The song database 222 is preferably searchable by each user via a search Web page (see, e.g., FIGS. 4g and 4l). The user database 218 is preferably a database having certain information for each registered user including, by way of non-limiting example, user id, password, station and song history, and other user-specific information. That database 218 is generally not directly accessible by a user, but is utilized when a user logs in to the radio station server. Each station database 220 includes a list of songs (e.g., a "song bin") that includes a plurality of unique identifiers (i.e., database entries) for a plurality of songs appropriate for the radio station genre or type. Initially, those songs are determined by an administrator of the radio station. However, over time, and as more users request songs on that radio station, the song bin is dynamically changed to reflect the songs requested by the users (i.e., by the listeners to that radio station). The song bin is used by the radio station server to determine what user-requested songs are played (that functionality being discussed in more detail below).

The ad server 216 provides for the insertion of advertising content into a playlist. The advertising content is preferably audio content, and may include non-audio aspects as well (e.g., video, still pictures, graphs, flash presentation, etc.). When a playlist is compiled, the ad server 216 inserts unique identifiers (e.g., urls) for advertisements into the playlist according to a predetermined criteria. For example, for a particular radio station, it may be determined that advertisements should be played every five songs. The ad server 216 will thus insert a unique advertisement identifier after every five songs in a playlist. When the playlist is played back by each user's media player, an advertisement will be streamed to the media player from a location identified by the unique identifier after every fifth song. The criteria for insertion of the advertisements is generally arbitrary. While the ad server 216 is depicted as part of the radio station server 200 in FIG. 1, it may alternatively be provided as a separate computing device (i.e., a separate server).

As mentioned above, the Web server 214 of the radio station server 200 serves content (e.g., information on the radio station, currently playing song, links to other Web sites, search window, etc.) to the users by providing a plurality of Web pages (see, e.g., FIGS. 4a-4l) for display by the browser on the user's computer 12; the Web pages typically being served in response to user selections. For example, when a user first connects to the radio station server 200 (by causing his/her browser to navigate to the predetermined Internet address of the radio station server 200), a radio home page 420 (FIGS. 4*a-d*) is transmitted by the server 200 to the user's browser. The radio station server 200 also transmits various other Web pages, such as a login Web page 400 (FIG. 4*e*), a registration Web page 402 (FIG. 4*f*), and a radio player Web page 410 (FIGS. 4*g-l*), depending upon the navigation carried out by each user.

The functionality provided in accordance with the present invention (e.g., radio station server functionality (Web server, station server, and ad server), content server functionality, and other functionality described herein), is preferably provided by one or more software files provided on the various servers and operable in connection with a respective processor thereof. The one or more software files may comprise, by way of non-limiting example, executable files, database files, scripts, HTML and/or DHTML files, applets, controls (ActiveX and/or Plug-ins), library files, .ASX files, .WAV files, and other files, as described in detail herein and as known to a person of skill in the art. However, it will be obvious to a person of skill in the art from the disclosure provided herein that the type of software files necessary to provide the various functionality of the present invention is a routine matter of design choice, and that the functionality of the present invention provided via the various servers and software files, and as described in detail herein may be provided by types or combinations of software files different from those described herein.

The content server 300 depicted generally in FIG. 1 and in more detail in FIG. 2, is connected to the network 110 and located at a predetermined Internet address is identifiable by a unique url (e.g., thecontentserver.com). However, unlike the radio station server 200, which is freely accessible by a user, the content server 300 connects to the network 110 through a local area network (LAN) 330, and thus may not be directly accessed by users or an unauthorized computer. Access to the content server 300 is by the radio station server 200 or by each user's media player.

Before proceeding with a detailed description of the operation and functionality of the radio station server 200, a general description of the operation and functionality of the inventive system 100 will now be discussed, with reference to FIG. 1. The system 100 of the present invention provides streaming audio content to each of a plurality of users 10 over a network 110 such as the Internet. The interconnection between and among the user computers 12, the network 110, the radio station server 200 and the content server 300 may be provided using any now known or hereafter developed interconnection and data communication devices (including both computer hardware and software), transmission medium, and methods; that aspect of the inventive system 100 not comprising a limitation or inventive feature of the present invention. A user 10 having a user computer 12, preferably having a browser and media player installed thereon and operable in connection with a processor thereof, connects to the Internet using the browser. By causing the browser to navigate to the predetermined Internet address (i.e., url) of the radio station server 200, the user 10 will receive from the radio station server 200 and via the browser certain software code (preferably, DHTML code, Java applet, media player instructions) that provide Web pages (see, e.g., FIGS. 4*a*-4*l*) and certain functionality and content to the user 10; generally referred to herein as user code and designated by reference numeral 1000 (see, e.g., FIG. 6). The user code 1000 is temporarily installed on a user computer (e.g., or the user's hard disk unit and/or in RAM) only while the user is connected to the radio station server 200 (i.e., the browser is at the radio station server url).

The user code 1000 controls certain aspects of the interaction between the client's browser and the radio station server 200 and content server 300. When the user logs off of the radio station server 200, the client code 1000 is removed from the user's computer 12.

For first-time users, certain Web pages will assist the user with establishing a user account with the radio station server 200. Once an account has been established, the user may select one of a plurality of radio stations available via the radio station server 200. When used herein in connection with the description of a Web page, the term "select" refers to an action by the user via which a graphic, picture, hypertext link, button, or other item displayed on a Web page may be chosen by a user using a mouse or other cursor control device. After selecting one of a plurality of predetermined radio stations, the Web server 214 of the radio station server 200 transmits a command to the user's computer 12 to launch the media player. Alternatively, and if a user does not have a media player installed on his/her computer, the Web server 214 will assist the user with locating (via the Internet) and installing a suitable media player. The station server 212 of the radio station server 200 then transmits a playlist for that radio station to the user for playback by the media player. The playlist is preferably a data file that comprises a plurality of unique identifiers (urls) for a plurality of songs. In one embodiment, the playlist is preprogrammed by a system administrator of the radio station server 200, for example. In another, preferred embodiment, the playlist is an aggregation of a plurality of user requests collected over a predetermined time period and filtered according to certain predetermined criteria. In either case, the playlist may be dynamically changed (by the station server 212 of the radio station server 200) over time as users request songs. In addition to unique song ids, the playlist may also contain one or more unique identifiers (urls) for advertisements (e.g., audio ad content) that will be inserted between songs in the playlist according to a predetermined schedule. The ad content may be streamed to the media player by the ad server 216, from the content server 300, or from some other streaming content server. The media player steps through the playlist and, for each of the plurality of unique identifiers (song or ad content), requests a song or ad, as the case may be, from the appropriate repository. In response to the request from the media player, the content server 300 (or other streaming content server) locates and transmits, via the streaming media server 320, the song to the user's media player. That process continues until the media player has reached the last song on the playlist. When the last song has been streamed by the content server 300 to the media player and played back, the media player sends an event to the user code 1000 that, in turn, transmits a message to the radio station server 200 that the end of the playlist has been reached. In response, the radio station server 200 transmits another playlist to the user's media player. That process continues for so long as the user is connected to and logged on to the radio station server 200.

Referring next to FIG. 2, the details of an exemplary content server 300 will now be discussed. Although FIG. 2 depicts a plurality of interconnected computers as the content server 300, it will be obvious to persons skilled in the art and from the disclosure provided herein that other embodiments and configurations will provide the functionality of the content server 300, and that FIG. 2 depicts an illustrative embodiment of a content server 300. In general, the content server 300 is the repository of the songs requested by and streamed to the users 10. The content server 300 facilitates the upload and storage of streaming media (e.g., songs) to the server 300 by a client 302, manages such uploaded and stored media, and makes that media available to users 10 in connection with the radio station server 200 and as discussed in more detail herein. While not discussed in detail, it will be obvious to persons skilled in the art that each server referred to herein typically includes a data storage device upon which various types of digital data may be stored and from which such stored digital data may be retrieved. For example, a suitable data storage device will provide for storage of compressed audio files (e.g., .wav files) in various formats (e.g., 32 kbps and 64 kbps).

A client 302, as depicted in FIG. 2, may comprise any entity that provides digital content, in this case, digital audio and advertisements, available to a user via the Internet. The activities carried out by the client 302 to store the digital content on a server, such as the content server 300, are transparent to the user 10 and typically performed independent of the present invention. However, the description of the content server 300 and the steps via which a client 302 may store digital content thereon are discussed herein as illustrative of an embodiment of the present invention.

As discussed in greater detail below, a client 302 uploads streaming media content to a repository server 306 either directly via an HTTP upload, or via an FTP ingest server 308. Once the client 302 has uploaded its streaming media content, the client 302 may manage its content via Web pages on a content management Web site (not shown) provided by a Web server 310 (not the same Web server as provided by the radio station server 200). The content management Web site preferably provides various Web pages (not shown) that serve as an interface through which the client 302 may access its account and select to upload new content, search the client's existing up-loaded content, create and edit playlists, browse the client's contents stored on the FTP server 308, and perform a batch upload of content from the FTP server 308 to the repository server 306, and other functionality, as a routine matter of design choice. Additionally, the content management Web site may serve as an interface for the client 302 to perform various administrative functions, such as setting and changing any of the client-defined account and file information described below.

An illustrative content server 300 may further include a file management server 312, one or more administrative terminals 314, and a script processor 316. In general, the file management server 312 controls the activities of the various other components to which it is connected. The administrative terminals 314, in turn, are connected to the file management server 312 to allow administrative staff of the entity maintaining the content server 300 to control the server 300. The script processor 316 works in conjunction with the file management server 312 to control overall operation of the content server 300. The script processor 316 preferably includes various software modules, including a task scheduler and program scripts and objects for batch uploads of content files and for recovery of deleted content files. It is to be understood that such task scheduling software may be obtained by any of a number of third-party vendors, and is not an essential or necessary part of the present invention. Similarly, the program scripts and objects disclosed and discussed herein may be written in any of a number of programming languages, such as PERL, Visual Basic, JavaScript, C+, C++, and the like.

A central aspect of the content server 300 is a content management (CM) database 318, an exemplary embodiment of which is generally depicted in FIG. 3, and which may include certain relational databases. In general, the CM database 318 includes account information which identifies each client's account, stream information which identifies and describes each item of streaming content within a client's account, playlist information which identifies and describes each client's playlist, batch information which defines the status of each client's batch up-load requests, and storage location information which tracks the storage of content on the repository server 306 and a streaming media server 320. Other information (more or less than previously described) may be included (or omitted, as the case may be) from the CM database 318, as a routine matter of design choice.

Under direction of the file management server 312, the uploaded content is eventually transferred from the repository server 306 to streaming media servers 320 (including any storage device associated therewith), where it is available for streaming transmission to a plurality of users 10 via the network 110. The content server 300 may utilize a playlist server 322 for dynamically generating a playlist metafile (such as ASX, RAM, SMIL, and RPM files, to name a few). That playlist is different from and independent of the playlist compiled by the radio station server 200 and transmitted thereby to each user's media player. In addition to archived content located on the streaming media server 320, live content may be streamed via encoders 324 connected to the streaming media server 320.

As depicted in FIG. 2, the content server 300 connects to the network 110 via a local area network (LAN) 330. More specifically, the repository server 306, FTP server 308, Web server 310, file management server 312, administrative terminal 314, script processor 316, CM database 318, streaming media server 320, and playlist server 322 are all in communication via a secure LAN 330 that protects the content server 300 from unauthorized access.

It is to be understood that although the embodiment of the content server 300 depicted in FIG. 2 utilizes a Web server 310 that is separate from the playlist server 322, in alternate embodiments the functionality of the playlist server 322 described herein may be implemented in software residing on the Web server 310, thereby obviating the need for a separate playlist server 322. Also, the embodiment of FIG. 2 depicts two sites (Site 1 and Site 2), providing for a redundant streaming media server 320, repository server 306, and FTP ingest server 308. Such an embodiment is a routine matter of design choice. Moreover, it is to be understood that the plurality of servers depicted in FIG. 2 may comprise separate computer hardware, or alternatively, they may be combined in various was, as a matter of design choice, to provide the functionality of the content server 300 in accordance with the present invention.

The CM database 318 will now be described in greater detail with reference to FIG. 3, and continuing reference to FIG. 2. The CM database 318 includes several logically discrete tables of information, each of which is described below. As will be appreciated by one skilled in the art, the arrangement of information in tables depicted in FIG. 3 and discussed herein is exemplary and that other arrangements are within the scope and spirit of the present invention. It is also to be understood that although the CM database 318 is described as a centralized database, it is within the scope and spirit of the present invention to distribute the contents of the CM database 318 throughout the content server 300.

The CM database 318 includes a CM Accounts Table 340 that generally includes a separate record for each client account, as identified by a CM account ID. Each such separate record includes account identifying information, such as account name, account directory, username, password, contact information (such as contact name, e-mail address, and telephone number), default title and author (which are preferences used to identify items of contents in the event no other title or author information is provided by the client), parent account ID (in the event the current account is related to another account), and security related information, including default preferences indicating whether the content is secure (allows security), and if so, a cryptographic key used for accessing such content (e.g., default security key) and a time period for which the key will be valid (e.g., default security interval).

The CM Accounts Table 340 also includes a field for a "site id", which uniquely identifies one or more FTP servers 308, repository servers 306, and streaming media servers 320 to which the content on the FTP servers 308 can be uploaded. Two representative sites are depicted in FIG. 2. Although not necessary for the present invention, each client account is preferably associated with a site located in the client's geographical area, or the geographical area where the client's users 10 are located so as to speed delivery of the streaming media content from the content server 300 to the user computer 12. Furthermore, it is to be understood that logically grouping an FTP server 308, repository server 306 and streaming media server 320 into one or more sites is not required. As noted below, much of the account identifying information of the present embodiment is provided by the client 302 during the registration process.

The CM database 318 further includes a plurality of tables containing content identifying information. More specifically, those plurality of tables include a CM Assets Table 342 that includes a plurality of records, each of which identifies an item of streaming content by a stream ID. Furthermore, each of the plurality of records in the CM Assets Table 342 includes a CM account ID, creation date of the item of content, description of the content, an identification of whether the content is audio and or video, the platform to which the content relates, the date on which the content was last modified, any coder-decoder (codec) necessary for viewing of the content, the length and size of the content, the expiration date (if any) of the content, the client or individual that up-loaded the content, and the date on which the content was processed into the content server 300. Each record in the CM Assets Table 342 correlates an item of content, as identified by the stream ID, to a particular client account, by reference to the CM account ID.

The CM database 318 also includes a Streams2 Table 344 that includes records identifying each item of content, as identified by a stream ID. Fields contained in the Streams2 Table 344 include the stream type, such as the stream type required by Microsoft Windows brand media player or RealNetworks brand media player, title of the content, author of the content, status of the content, copyright notice for the content, URL prefix, bite rate of the content, file name of the content (as provided by the client 302), stream format, such as the format required by Microsoft Windows brand media player or RealNetworks brand media player, advertisement tag, start time, duration, and expiration date.

As depicted in FIG. 3, the CM Assets Table 342 has 3 additional tables related thereto: the CM Stream Keywords Table 346, CM Assets Locations Table 348 and CM Archive Volume Table 350. The CM Stream Keywords Table 346 includes a stream ID and associated keywords for each item of content, as provided by the client 302.

The CM Assets Locations Table 348 includes a plurality of records identified by location ID which is a unique identifier for each portion of data storage containing an item of content. As such, location IDs may refer to data storage on either a repository server 306 or a streaming media server 320. A given content file may be stored at multiple location IDs, for example one on a media server 320 and one on a repository server 306. More specifically, each record in the CM Asset Locations Table 348 includes a CM volume ID, for identifying the portion of the server on which the associated content resides, stream ID for identifying the item of content stored at the location ID, and status of the item of content.

The CM Archive Volume Table 350 is also related to the CM Asset Table 342 and, more particularly, to the CM Asset Locations Table 348. The CM Archive Volume Table 350 includes records for each CM volume ID. Each record includes: volume type which indicates whether the volume ID pertains to a repository server 306, streaming media server 320, FTP server 308, script processing server 316 or Web server 310; archive server name indicating the LAN name of the particular repository server 306 or streaming media server 320, as the case may be, containing the volume ID; the server's DNS address; the platform for the content, such as Microsoft Windows or RealNetworks brand media players, the status of the content associated with the volume ID; the maximum storage capacity for the server continuing the volume ID; and the site ID of the server containing the volume ID.

Also associated with each client account identified in the CM Accounts Table 340 is playlist information, which is contained within the CM Playlists Table 352, Content Group (CG) Table 354, and Content Group Streams Table 356. In general, the CM Playlist Table 352 includes a plurality of records identifying each playlist, as identified by a content group ID. Each record further includes the CM account ID and the sort order, which indicates the ordering of the items of streaming content associated with the particular playlist.

The Content Group Table 354 includes a plurality of records for each playlist, and may be identified by the playlist's content group (CG) ID. In general, each record contains the playlist details, including the CG advertisement tag, the type of playlist, the CG description, the CG format, the CG label, the meta-url for the playlist, CG notes, and an indication as to whether the content group is shared.

Playlist entries may be identified in a CG Stream Table 356. More specifically, the CG Stream Table 356 includes a plurality of records identifying each item of content as part of a content group and further includes an indication of the order of the particular item of content within the content group. As such, each record in the table includes the content group ID, stream ID, and sort order.

The CM database 318 also includes a CM Batch Jobs Table 358 table that indicates its status of client-requested batch up-loads and includes a plurality of records identifying the status of each requested batch job, as identified by a CM batch job ID. Each record in the CM Batch Job Table 358 includes the CM account ID identifying the account to which the batch job relates, the file name of the batch file (filename), the time which the client 302 submitted the batch request (submit time), the time at which the process was started (process start time), the time at which the batch process ended (process end time), and an indication as to whether the batch file was removed from the client's account (file removed). Because each record in the CM Batch Jobs Table 358 includes the CM account ID, each such record is related to a record in the CM Accounts Table 340.

The CM database 318 also includes a Stream-Servers Table 360 having a plurality of records that correlate each file, as identified by its stream ID, with the hostname of the streaming server 320 on which it resides. While each stream ID will only have one record, a particular file will have as many records as it has copies residing on different streaming servers 320.

The Servers2 Table 362 includes a record for each streaming server 320, as identified by its server address, setting forth various metrics for the server 320, such as the category, port, class and weight or relative number of streams being served to end users 10.

The CM Sites Table 364 contains a record for each site, as identified by its site ID. More specifically, each record identifies the name of the site, the FTP server uniform resource locator (URL) associated with the site and the processor URL associated with the site. In the present embodiment depicted in FIG. 3, each site only includes one FTP server 308.

As depicted in FIG. 3, the CM database 318 also includes a CM Deleted Accounts Table 370 and a CM Recovery Jobs Table 368, respectively relating to the deletion and recovery of files. The CM database 318 also includes a CM Accounts Service Levels Table 272 identifying each client's service level and categorizing the clients' accounts. As depicted in FIG. 3, the CM database 318 also includes a CM Deleted Assets Table 372, which includes deleted assets information, and a CM Deferred Delete Table 374, which includes deferred delete information.

The above-described tables of the CM database 318, their structure, functionality and interrelationship, are exemplary of a preferred embodiment of the present invention. It will be obvious to a person of ordinary skill in the art that the CM database 318 may comprise other structures, tables, and interrelationships, without departing from the scope and spirit of the present invention.

Figure 4A:
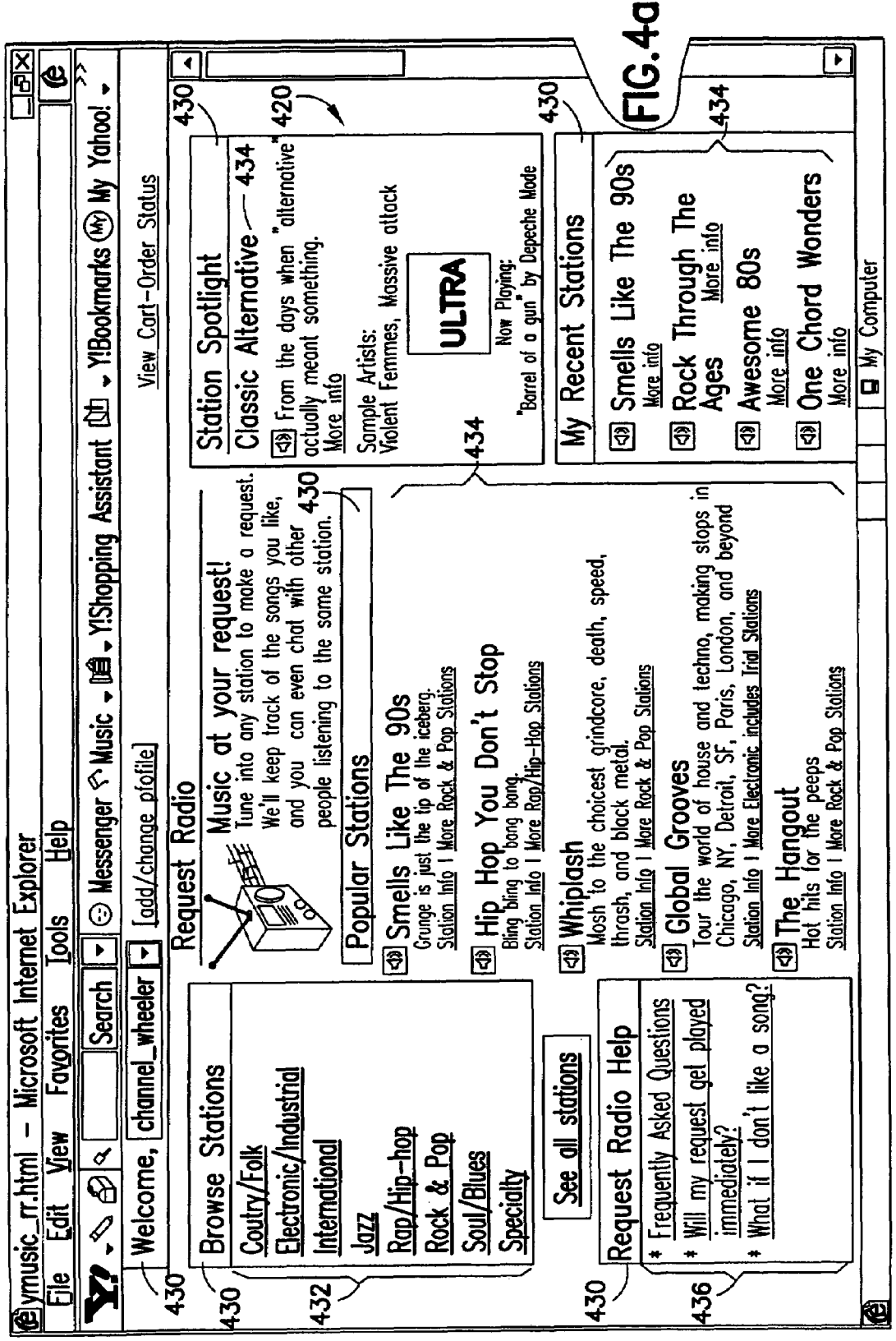
Figure 4B:
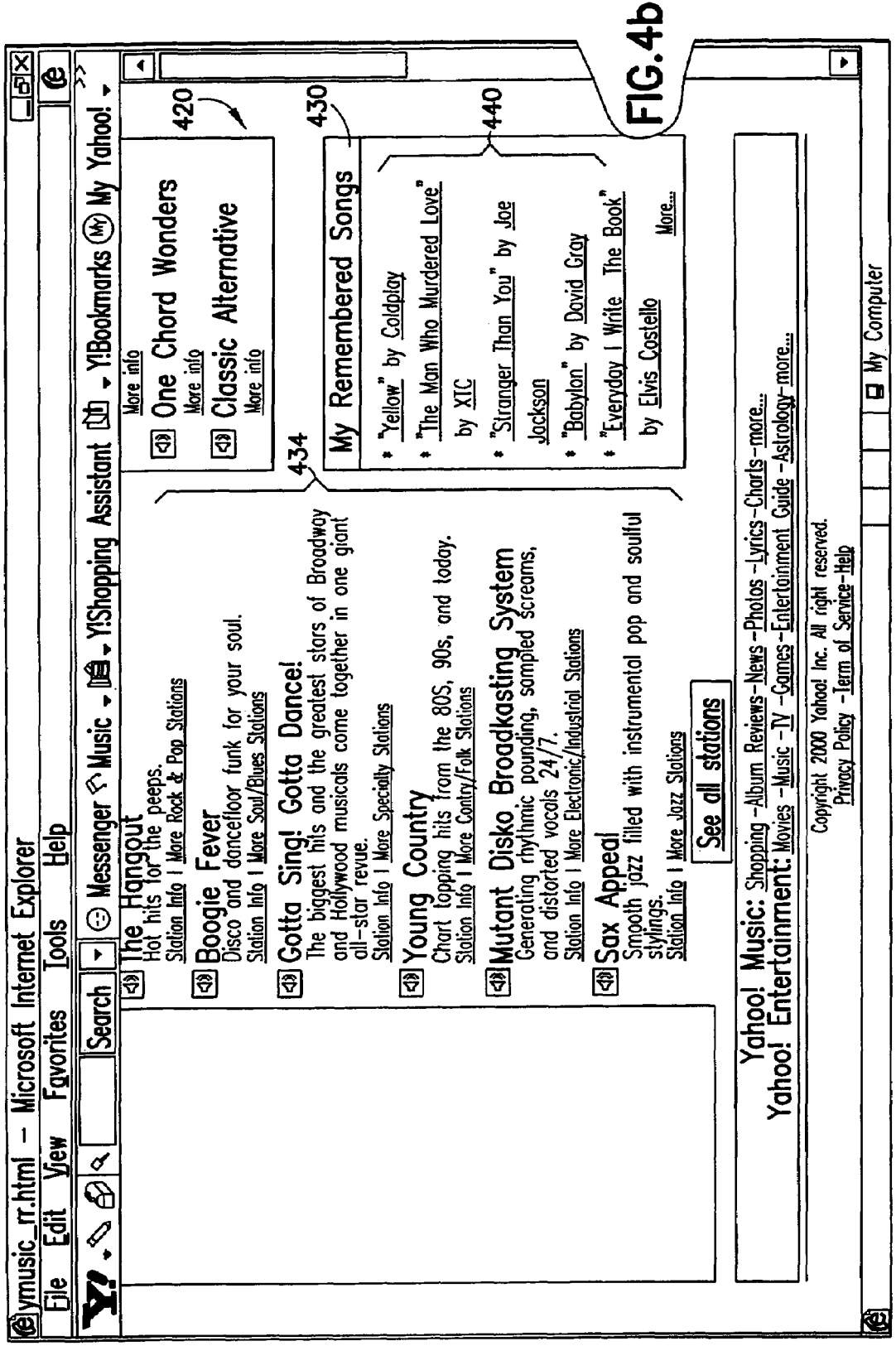
Figure 4C:
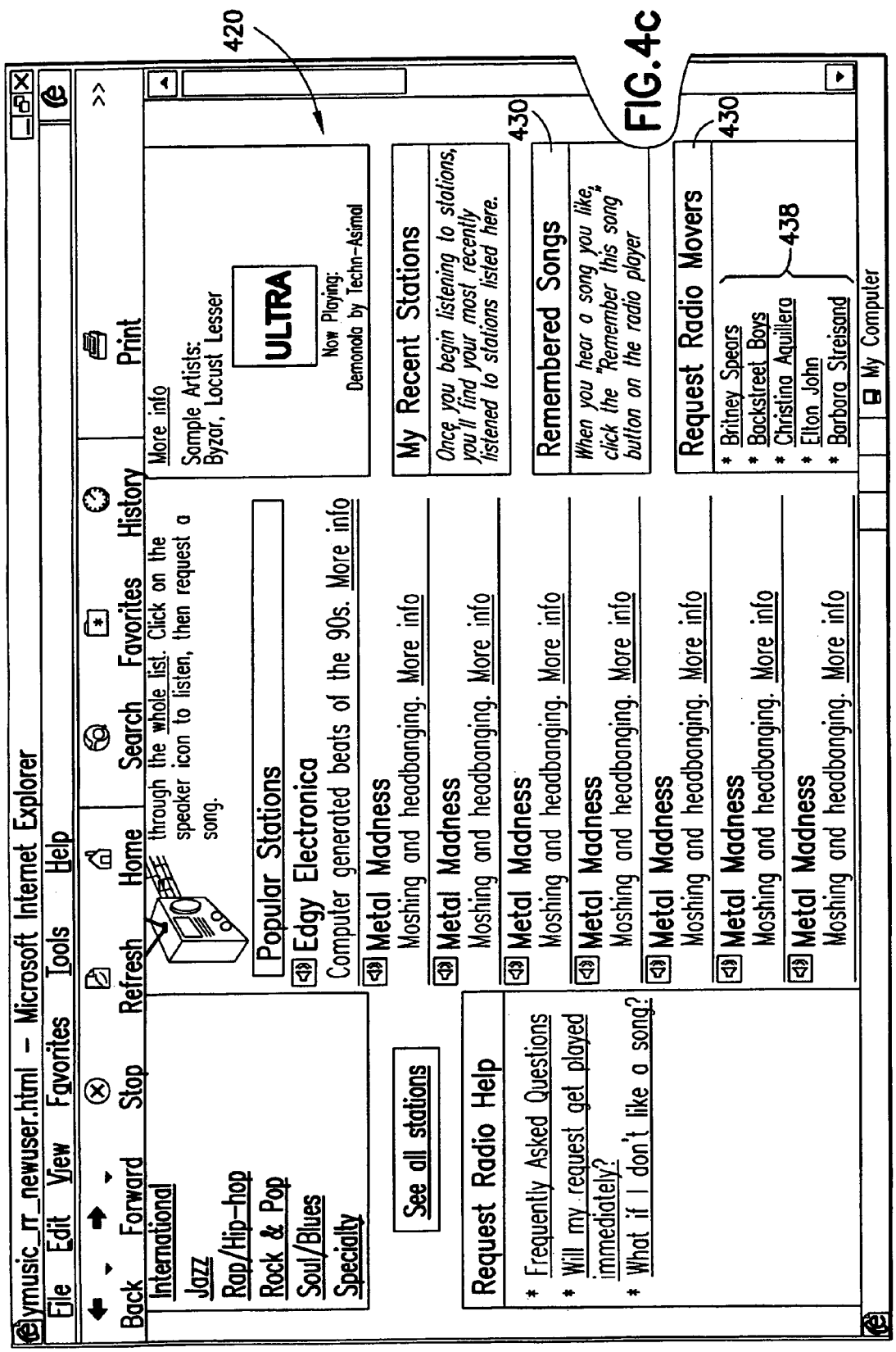
Figure 4D:
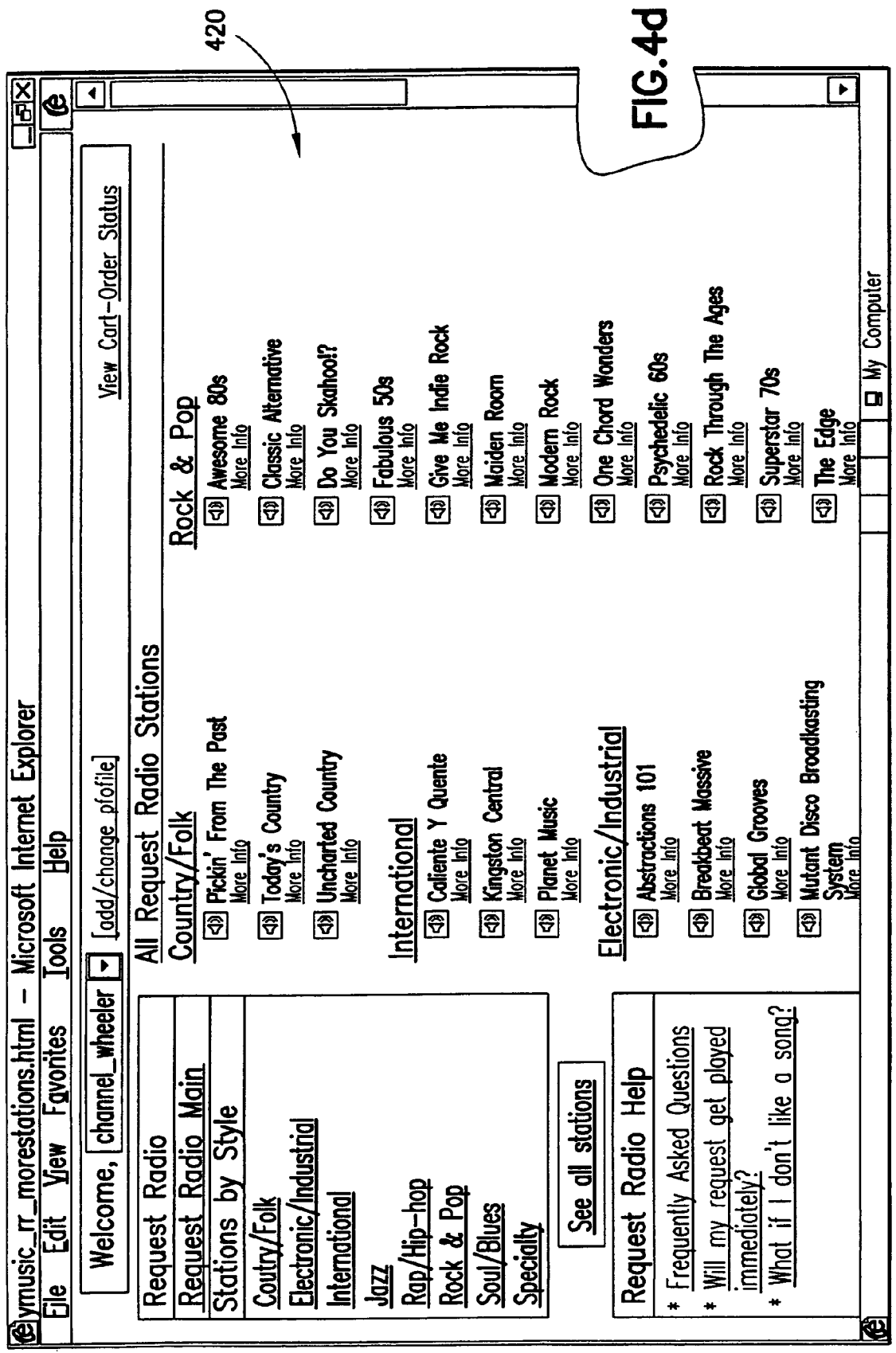
Figure 4E:
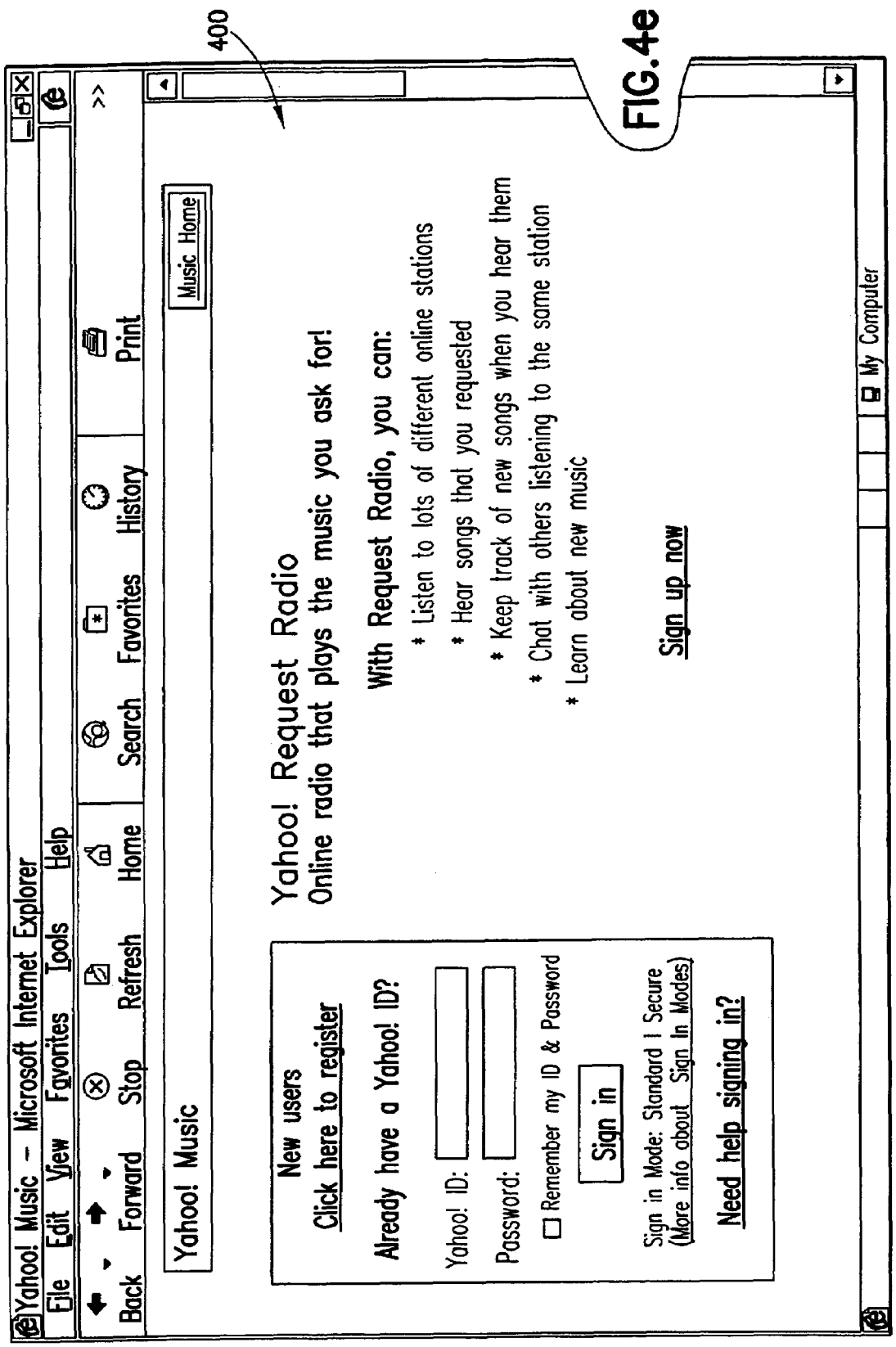

Referring next to FIGS. 4a-4l, the Web pages provided by the Web server 214 of the radio station server 200 will now be discussed in detail. Each of the illustrative Web pages depicted in FIGS. 4a-4l are provided by the Web server 214 of the radio station server 200 and may comprise HTML and/or DHTML code and application code such as, for example, Java applet code and media player related code; collectively referred to herein as user code and designated by reference numeral 1000. Initially, each user must register before being able to request songs. However, non-registered users may listen to songs, but may not submit requests. The Web server 214 of the radio station server 200 transmits a login Web page 400 to the user's browser, as depicted in FIG. 4e. If already registered, a user may enter an ID and password to log in to the radio station server 200 by selecting a "Sign in" or other similar button. If not registered, a user may select a "Click here to register" link (or other similar link), which will cause the Web server functionality 214 to transmit a registration Web page 402, as depicted in FIG. 4f. The registration Web page 402 provides a plurality of windows 405 and pull-down menus 407 within which the user may provide certain user-specific information. For example, the user may enter a unique ID and password, information that can be used to assist the user if he/she forgets the password, and personal information such as, for example, first and last name, language, zip code, gender, occupation, and other user-specific information. That information will be maintained in the user database 218 (see, e.g., FIG. 7).

Once a user has registered and logged in to the radio station server 200, the Web server 214 transmits a radio home page 420, such as is depicted in FIGS. 4a-4d. It should be noted that FIGS. 4a-4d are not intended to depict four separate radio home pages transmitted by the Web server. Rather, FIGS. 4a and 4b depict a single example of a radio home page 420, and FIGS. 4c and 4d depict variations of that home page 420. Variations of the radio home page other than those depicted in FIGS. 4a-4d may also be provided in accordance with the present invention. With reference to FIGS. 4a and 4b, the radio home page 420 provides a plurality of banners 430, each of which serves to identify certain options available to the user. For example, a "Welcome" banner 430 displays the user's ID and provides an "add/change profile" link that enables the user to add or change certain information specific to that user's account. A "Browse Stations" banner 430 provides a list of station-type hypertext links 432, each of which may be selected by the user. When a user selects one of the station-type hypertext links 432, the Web server 214 transmits a Web page, such as is depicted in FIG. 4d, to the user's browser that lists the station(s) available for the selected station type. For example, and with reference to FIG. 4d, by selecting the "Country/Folk" hypertext link 432 depicted in FIG. 4a, the user may receive a Web page that lists the three illustrative stations identified under "Country/Folk", e.g., "Pickin' From The Past", "Today's Country" and "Uncharted Country". More, less, or different stations may be listed, as a matter of design choice. When the user selects a specific station within a station type, the user connects to that station via the radio station server 200 and a radio player Web page 410 (see, e.g., FIG. 4g) is provided by the radio station server 200.

With continued reference to FIGS. 4a-4d, the radio home page 420 provides a "Request Radio Help" banner 430 which lists one or more hypertext links 436, each of which may provide assistance to a user. The radio home page 420 also provides a "Popular Stations" banner 430 which provides a plurality of hypertext links 434 to stations that are most requested, listened to, or connected to by the various users. That list of hypertext links 434 may be periodically updated and may reflect the users' listening preferences over a predetermined time period. The radio home page 420 may also provide a "Station Spotlight" banner 430 that identifies a specific station and provides a hypertext link 434 to that station. Beneath the "Station Spotlight" banner 430 may also be provided certain information on the spotlighted station. For example, and as depicted in FIG. 4a, information on what song and/or artist is currently playing on the spotlighted station may be provided. A "My Recent Stations" banner 430 may provide information specific to the user for the stations recently listened to and preferably includes hypertext links 434 to those stations. That list is preferably periodically updated as the user listens to different stations. The radio home page 420 may also provide a "My Remembered Songs" banner 430 that includes a list of hypertext links 440 to each of a plurality of songs selected by the user, as depicted in FIG. 4b. As discussed in more detail below with reference to FIGS. 4g-4k, a user may designate one or more songs to "remember", and a hypertext link for each of those songs will be added to the list of songs provided under the "My Remembered Songs" banner 430.

The radio home page 420 may also provide other banners, such as are depicted in FIG. 4c. For example, a "Request Radio Movers" banner 430 may be provided that includes a list of hypertext links 438 for each of a plurality of artists. That list may be an aggregation of artists most requested by users, or it may be determined by an administrator of the radio station server 200, as a routine matter of design choice.

With reference next to FIGS. 4g-4m, the present invention will now be described in further detail. After a user selects a radio station (such as, by selecting a hypertext link provided on the radio home page 420), the Web server 214 transmits a radio player Web page 410 to the user's browser. The radio player Web page 410 includes an upper window 500, an information window 478, and a lower window 470 that provides various option tabs for each user to request songs ("Request" tab 472), display previously played songs ("Top 10" tab 474), and communicate with other users ("Chat" tab 476).

Figure 4G:
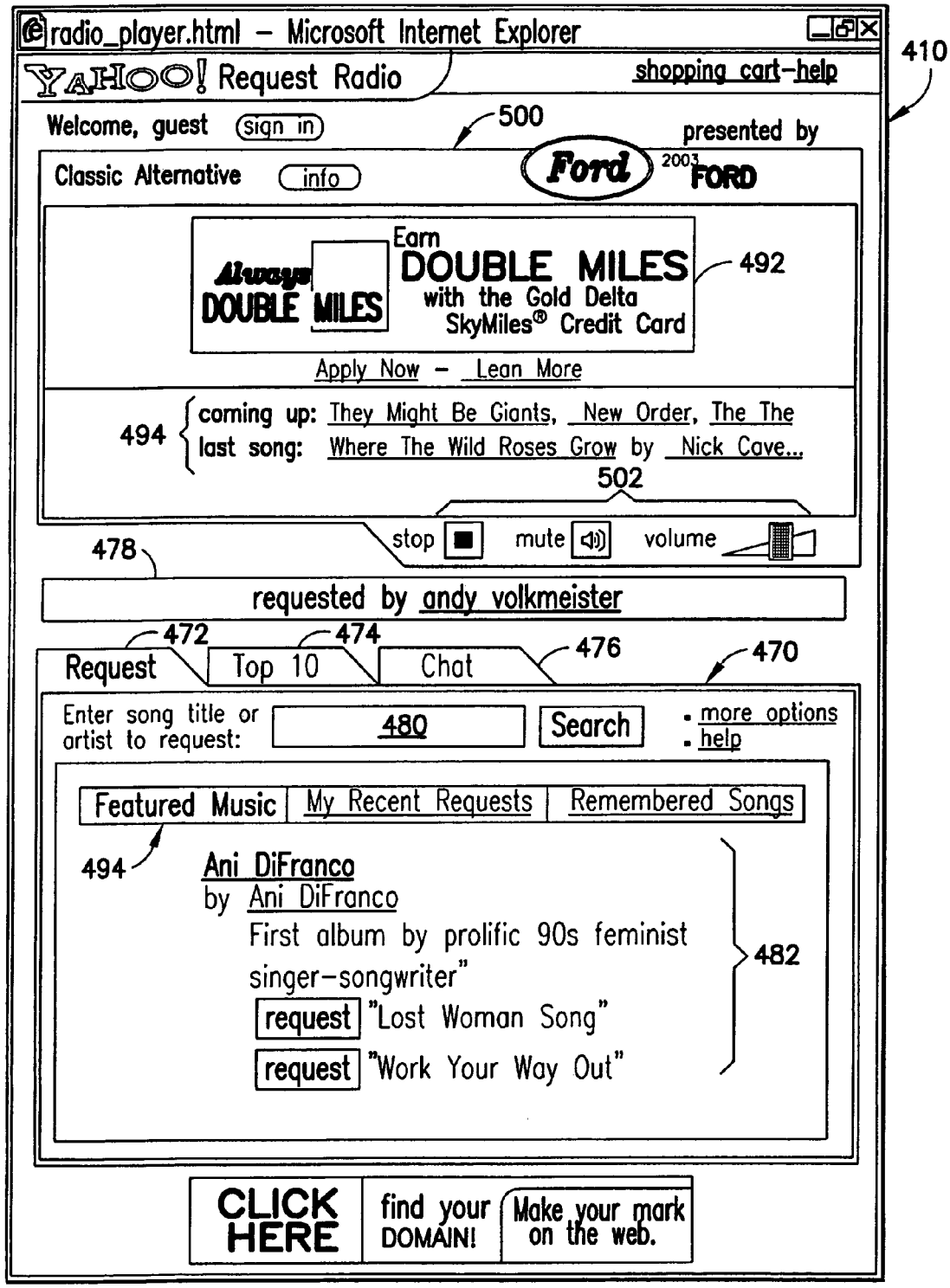
Figure 4H:
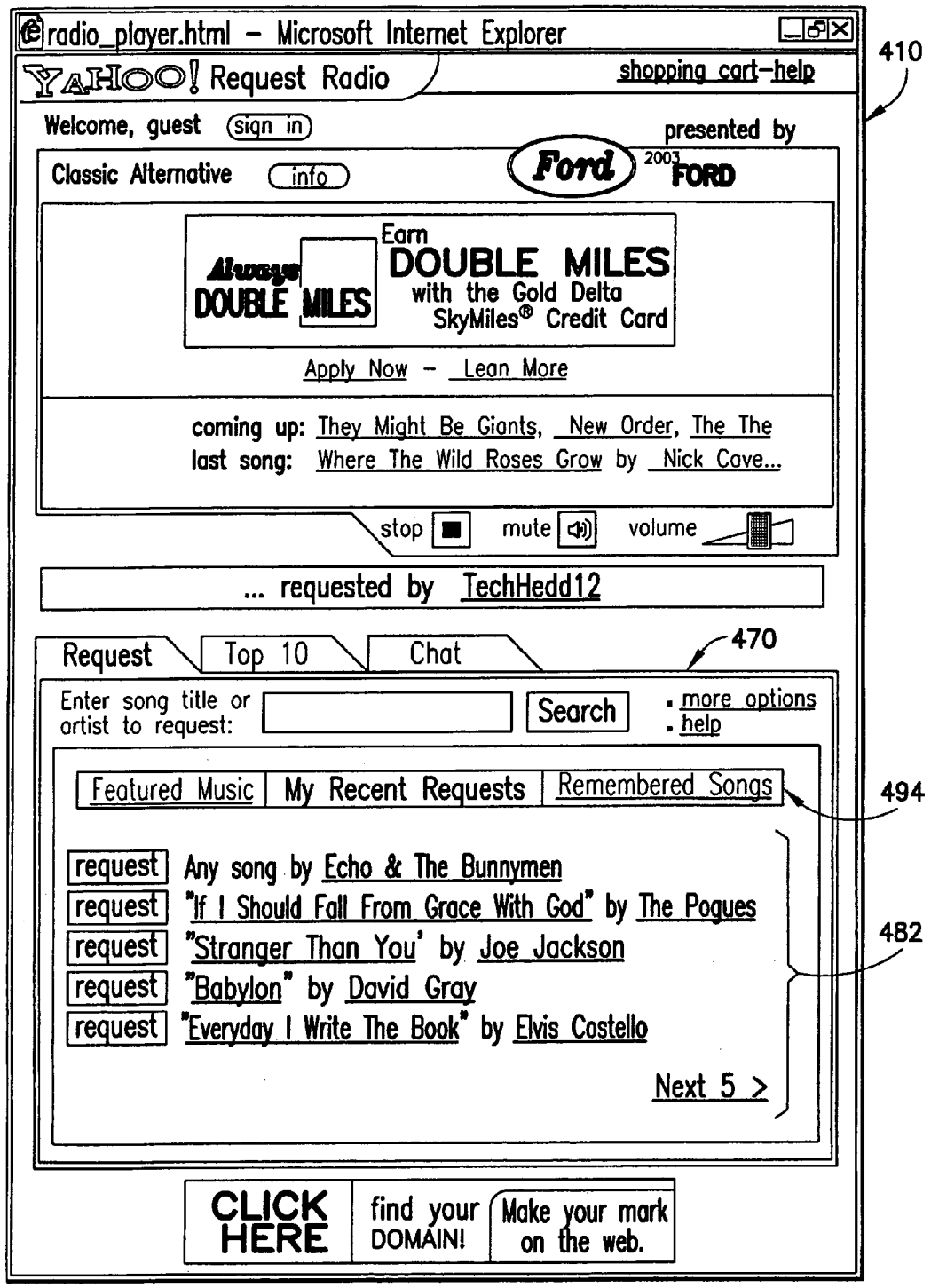
Figure 4I:
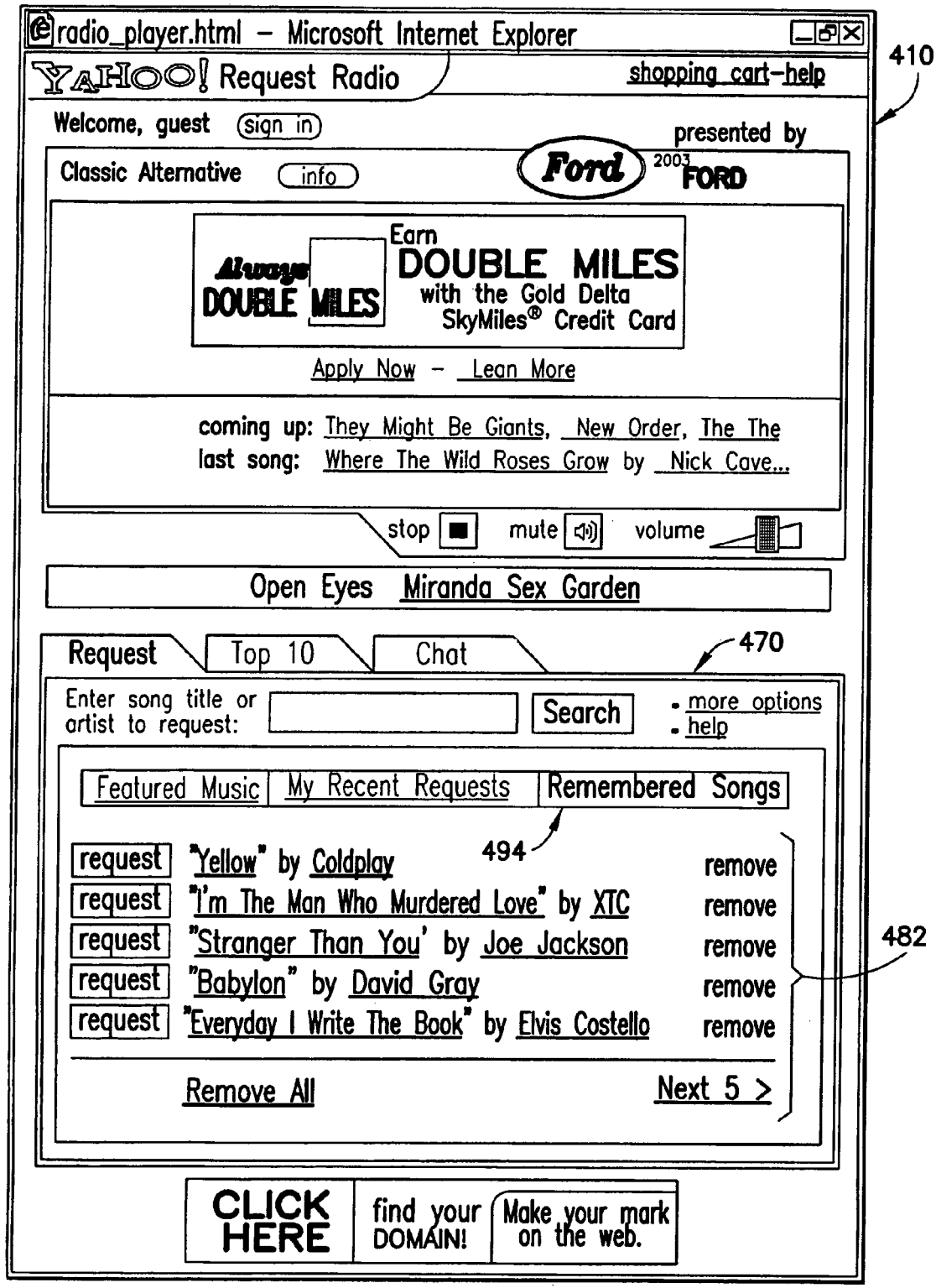

In FIG. 4g, an advertisement 492 is displayed in the upper window 500, and may include both visual and audio parts, as a matter of design choice. Also displayed in the upper window 500 is information on the previously played song ("last song"), and next to be played song ("coming up") on the playlist, including hypertext links 494 and other information (e.g., artist, record label, etc.) for that next to be played song and the previously played song. The upper window 500 also includes a plurality of player control buttons 502 such as, for example, stop/play, mute and volume, that enable the user to control certain aspects of the song as it is played back.

The information window 478 displays information on the status of the song currently being played (e.g., buffering), including who requested the song and a hypertext link to that user's id. Selecting that hypertext link will cause a chat window 488 (see, e.g., FIG. 4k) to open in the lower window 470 via which the user can chat (e.g., send instant messages, e-mail, etc.) with any other user currently listening to the same radio station. In an embodiment of the invention, messages may be sent between users not currently listening to the same radio station. When a user requests a song, the information window 478 also displays an acknowledgement that the user's song request has been received and logged. In a preferred embodiment, information displayed in the information window 478 automatically scrolls while the radio player Web page 410 is displayed.

The lower window 470 provides three option tabs 472, 474, 476 that are selectable by the user to provide certain functionality within the radio player Web page 410. When a user selects the Request tab 472, depicted in FIG. 4g, a search window 480 is provided in the lower window 470 which the user can use to search the song database 222. The user may also select a "more options" hypertext link to open a more detailed search window 520, as depicted in FIG. 4l. Via the more detailed search window 520, a user may enter specific search criteria such as, for example, artist, song title, music style, and release dates, by way of non-limiting example.

Also provided when the user selects the Request tab 472 is a banner 494 that provides three user-selectable links to "Featured Music", "My Recent Requests", and "Remembered Songs", each of which cause different and new content to be displayed in the lower window 470. For example, and with reference to FIG. 4g, when a user selects the "Featured Music" option in the banner 494, information (content) on a particular artist and/or song will be displayed in the lower window 470, including hypertext links to additional information on that artist and/or song, collectively designated as 482. Alternatively, when a user selects the "My Recent Requests" option in the banner 494, the information (content) depicted in FIG. 4h will be displayed in the lower window 470. In that case, the content may include a plurality of songs recently requested by that user, and hypertext links to each of the requested songs. The user may select a "request" button provided next to each listed song which will cause that song to be requested on the next playlist (as discussed in more detail below). Acknowledgement of such a request will be provided in the information window 478. The user may also select the "Remembered Songs" option in the banner 494, in which case the information (content) depicted in FIG. 4i will be displayed in the lower window 470. The user may select a "request" button provided next to each listed song which will cause that song to be requested on the next playlist. Acknowledgement of such a request will be provided in the information window 478. The user may also select to remove any or all more of the listed songs from the "Remembered Songs" list by selecting the "remove" hypertext link located next to the song to be removed, or by selecting the "Remove All" hypertext link remove all the songs and clear the user's "Remembered Songs" list.

Figure 4J:
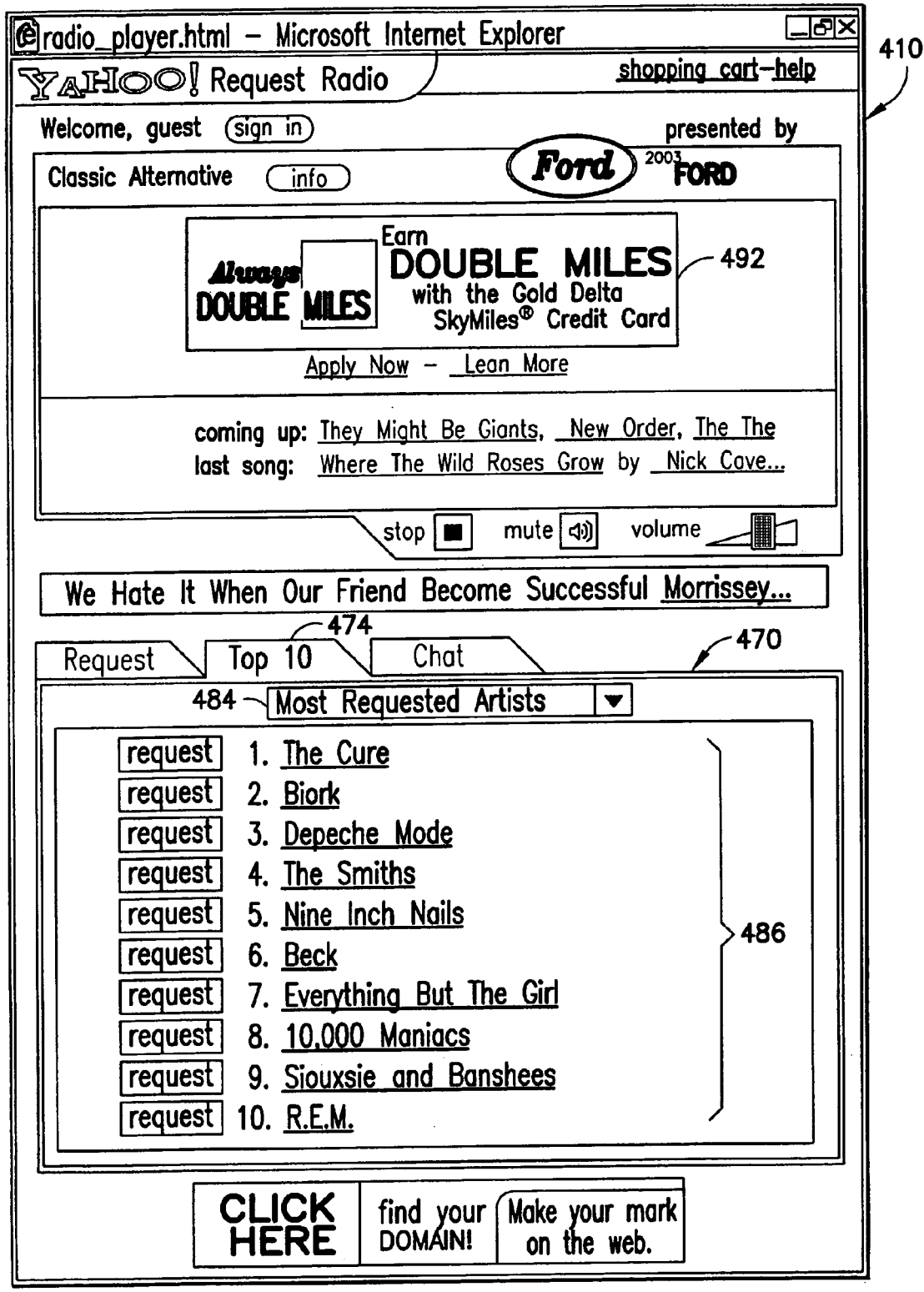

When the user selects the Top 10 tab 474 of the lower window 470, the information (content) depicted in FIG. 4j will be displayed in the lower window 470. That information includes a plurality of hypertext links 486 for a plurality of songs (i.e., the top 10 requested songs), and a "request" button next to each song which may be selected by the user. A pull-down menu 484 enables the user to select a category for the top 10 information displayed in the lower window 470. By way of non-limiting example, the pull-down menu 484 may provide user-selectable options such as "Most Requested Artists" (depicted in FIG. 4j), "Most Requested Songs", "Top Requestors", "Top Requestors Who Get Played", "Most Played Artists", "Most Played Songs", "Highest Rated Songs", "Top Mover Artists" and "Top Mover Songs." The foregoing list is merely illustrative, and other user-selectable options may be provided via the pull-down menu 484.

Figure 4K:
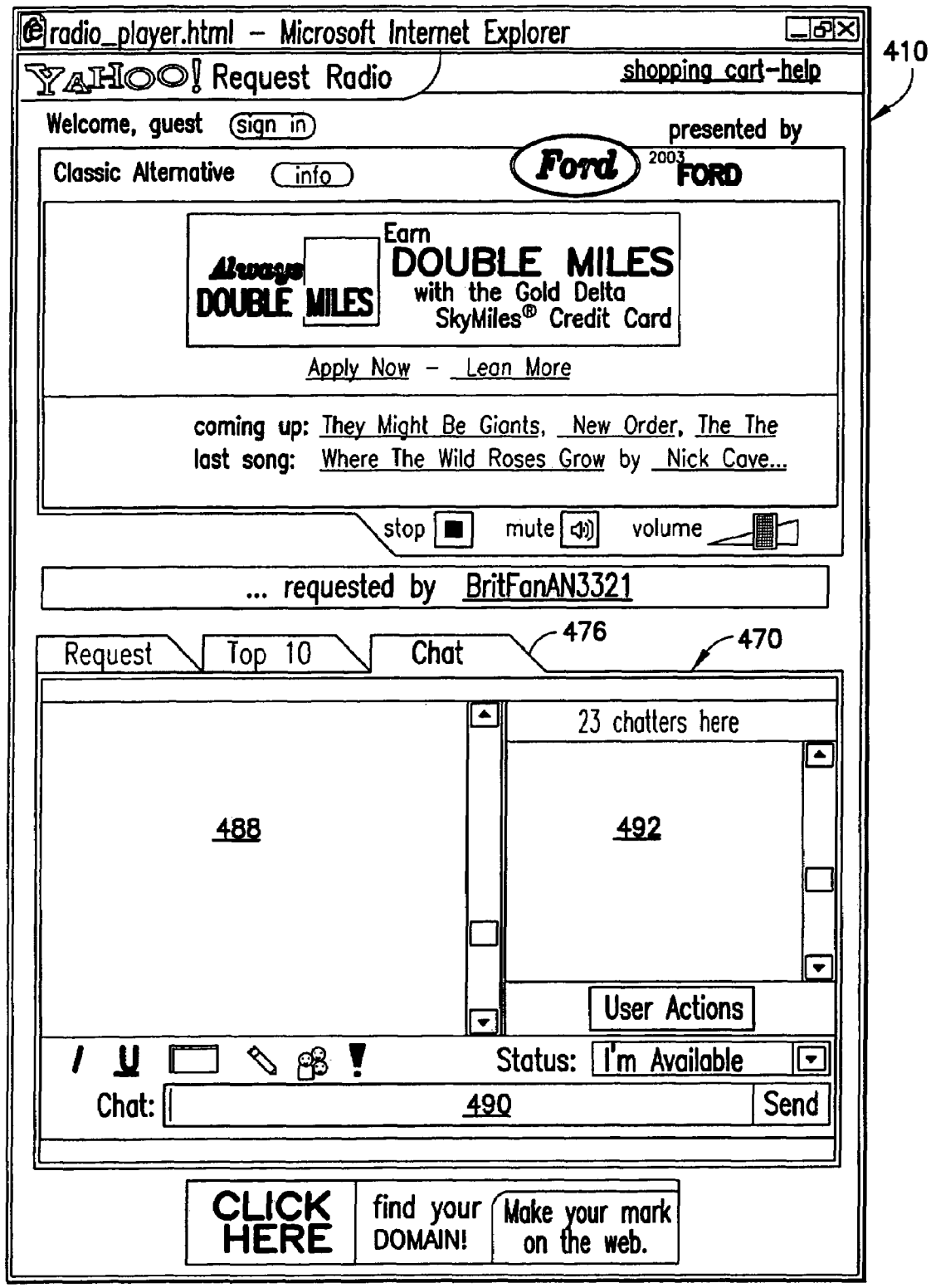
Figure 4L:
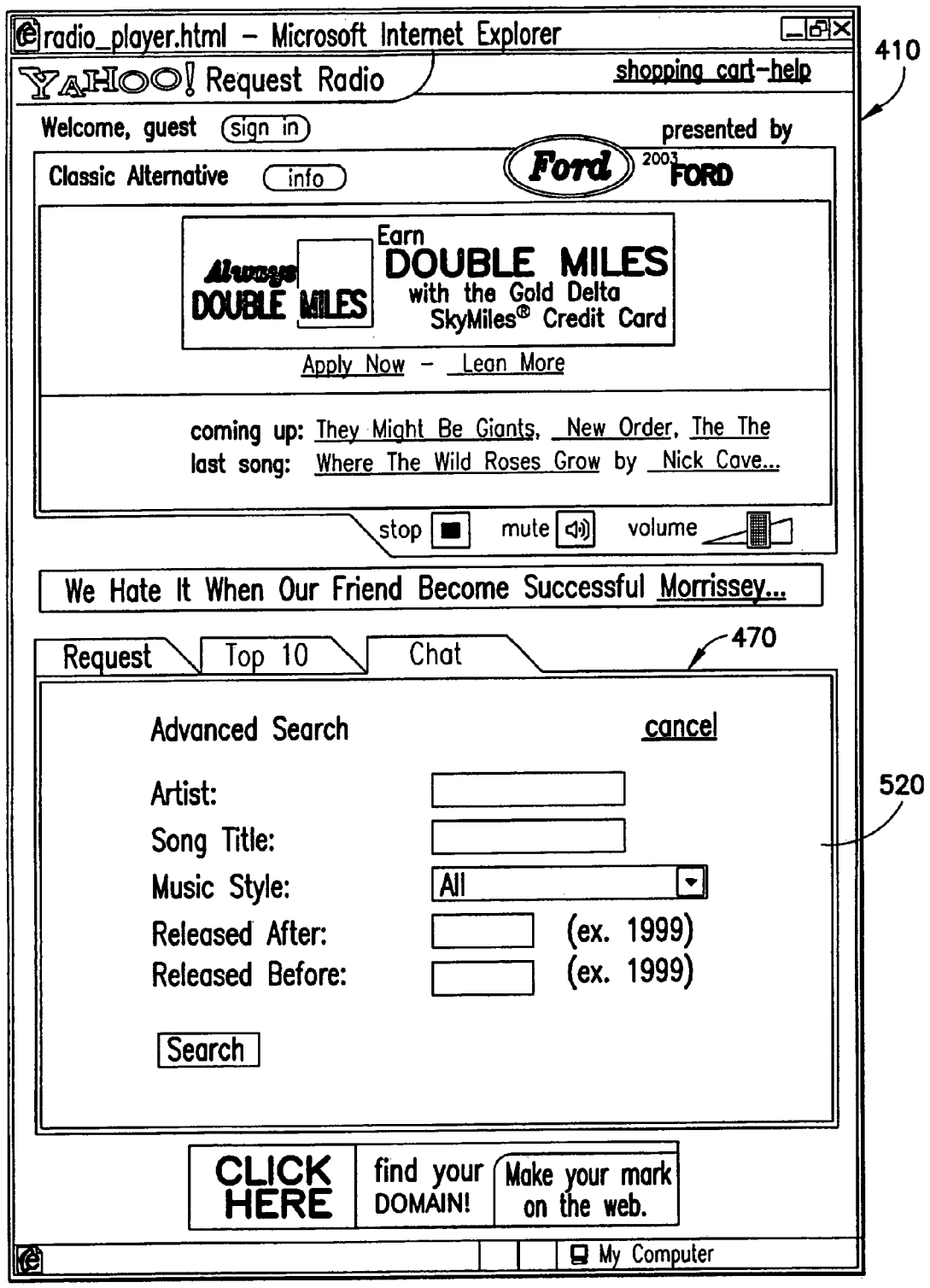

When the user selects the Chat tab 478 of the lower window 470, a message window 488, which is preferably an instant message window, and an active user window 492 are provided in the lower window 470, as depicted in FIG. 4k. Also provided is a chat window 490 within which users may type text messages. To send a message to another user, the present user selects the desired recipient user from the list of users in the active user window 492. The present user may then enter the text message in the chat window 490, and cause the message to be sent to the recipient user by selecting the "Send" button. Messages sent and received by the present user are displayed in the message window 488. The management of chat messages may be performed by a chat server. The chat server may comprise one or more servers, which may be separate and discrete from, or co-resident with the other described servers, as an application specific design choice by one skilled in the art as directed by the present application.

Figure 4M:
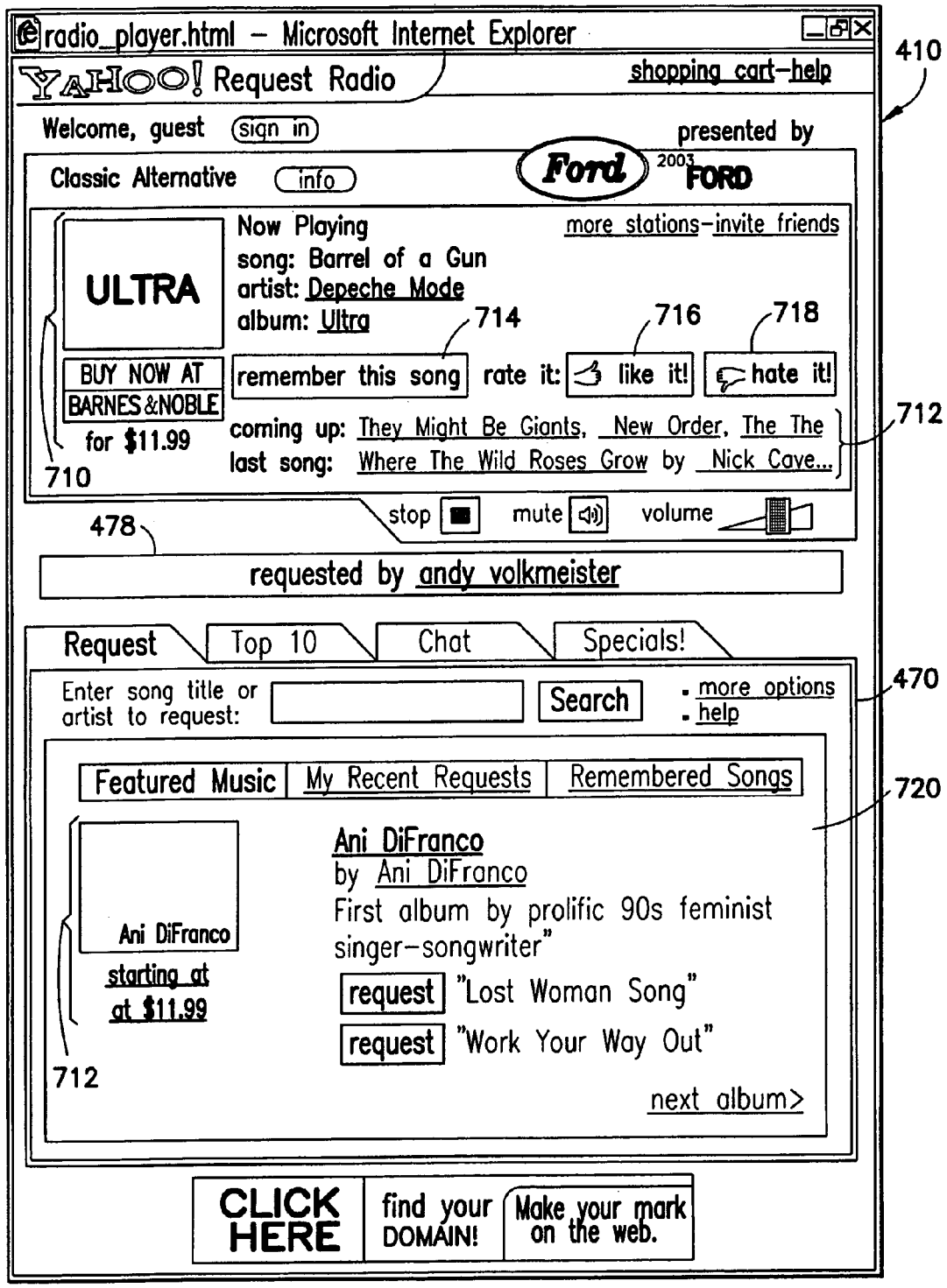

When in Play Mode, the information (content) depicted in FIG. 4m may be displayed in the upper window 410 and the lower window 470. Information displayed in upper window 410 may include current song information 710. Current song information 710 may include, by way of non-limiting example, the name or the song currently being played, the artist performing the song, and the album from which the song was selected. Upper window 410 may also include play list information 712. Play list information 712 may include, by way of non-limiting example, the previously played song and the next song to be played. Upper window 410 may also include "remember this song" button 714, which would serve to flag the song currently being played for later reference, requesting, or purchasing. In addition, upper window 410 may include "like it" (or "thumbs up") button 716 and "hate it" (or "thumbs down") button 718 for voting for or against, respectively, the currently played song.

In play mode, lower window 470 may display Featured Artist information 720. Featured Artist information 720 may include, by way of non-limiting example, an artist name, image, an album name, a description of the artist and/or an album, and the name of songs by the artist that may be requested.

When a user connects to the radio station server 200, certain user software code (e.g., DHTML, Java applet, media player instructions and related code) is transmitted by the radio station server 200 and stored in memory (e.g., RAM) (not shown) and/or on a hard drive (not shown) of the clients computer 12. The user code is generally designated as 1000 in FIG. 6, and the DHTML, Java applet, and media player instructions are respectively generally designated as 1010, 1020 and 1030. The user code 1000 coordinates communication between the user and the radio station server 200 and content server 300. Content server 300 is connected to network 110 via connection 26. In an illustrative embodiment, the DHTML code and the Java applet communicate with the radio station server 200 over the same physical connection 20 to the radio station server 20, but over different logical connections 22, 24 with the station server 212 and Web server 214, respectively. The software 210 provided on radio station server 200 is capable of determining over which logical connection the communication from the user code 1000 is transmitted, and can respond accordingly. The media player instructions 1030 of the user code 1000 communicate with the content server 300 over the same physical connection 20 from the user computer and receive streaming content (e.g., songs) according to a predetermined playlist provided by the station server functionality 212. In an illustrative embodiment, the media player instructions provide the playlist to a media player installed on the users computer 12, and coordinate operation of the media player in connection with the various Web pages provide in accordance with the present invention (see, e.g., FIGS. 4g-4l).

In general, the Web server 214 serves content to each user (including the various Web pages depicted in FIGS. 4a-4m), and facilitates most communication by the users with regard to the various Web pages. As is typical with a connection between a browser and a server, the logical connection established by the user's browser to the Web server 214 is temporary, and active only while the Web server 214 is transmitting content to the browser, or visa-versa. Thus, while a user is communicating with the Web server 214, a logical connection between the user's computer (i.e., browser) and the Web server 214 exists; that temporary logical connection being depicted by a dashed line and reference numeral 24 in FIG. 6. When a user selects a hypertext link, a new logical connection is established between the browser and Web server 214 over which the requested content may be transmitted. Once the content has been transmitted, that logical link is terminated.

However, when a user submits a request for a specific song via the radio player Web page 410, a persistent connection is established between the user's computer and the station server 212, as depicted by dashed line 22 of FIG. 6. Control over what type of connection (e.g., temporary of persistent) is established between the user's computer and server is determined by the user code 1000, which determines whether a user action requires communication with the Web server 214 or station server 212, and establishes the necessary temporary or permanent connection.

A playlist may be compiled with or without user input. For example, if a radio station is new or has not been selected (i.e., visited) by many users, the playlists for that radio station may need to be compiled by a system administrator, for example. A "precompiled" playlist may also be provided where too few users have submitted requests for songs to make up an entire playlist. One or more precompiled and generally static playlists may thus be stored for transmission to each user. When a first user initially connects to the radio station server 200, as part of the log on process (see, e.g., FIG. 4e), that user enters a user name and password, and selects a "Sign in" button which transmits the name, password and a cookie to the radio station server 200. If the user then selects a radio station (see, e.g., FIGS. 4a-4d), the station server 212 will transmit a playlist to the user. The station server 212 may be configured to provide a new playlist to each "listening" user at the top of every hour (e.g., 7:00, 8:00, etc.), or according to some other predetermined schedule. The transmitted playlist may be a precompiled playlist, as described above, or a playlist compiled based on user input, as described in more detail below.

Figure 5:
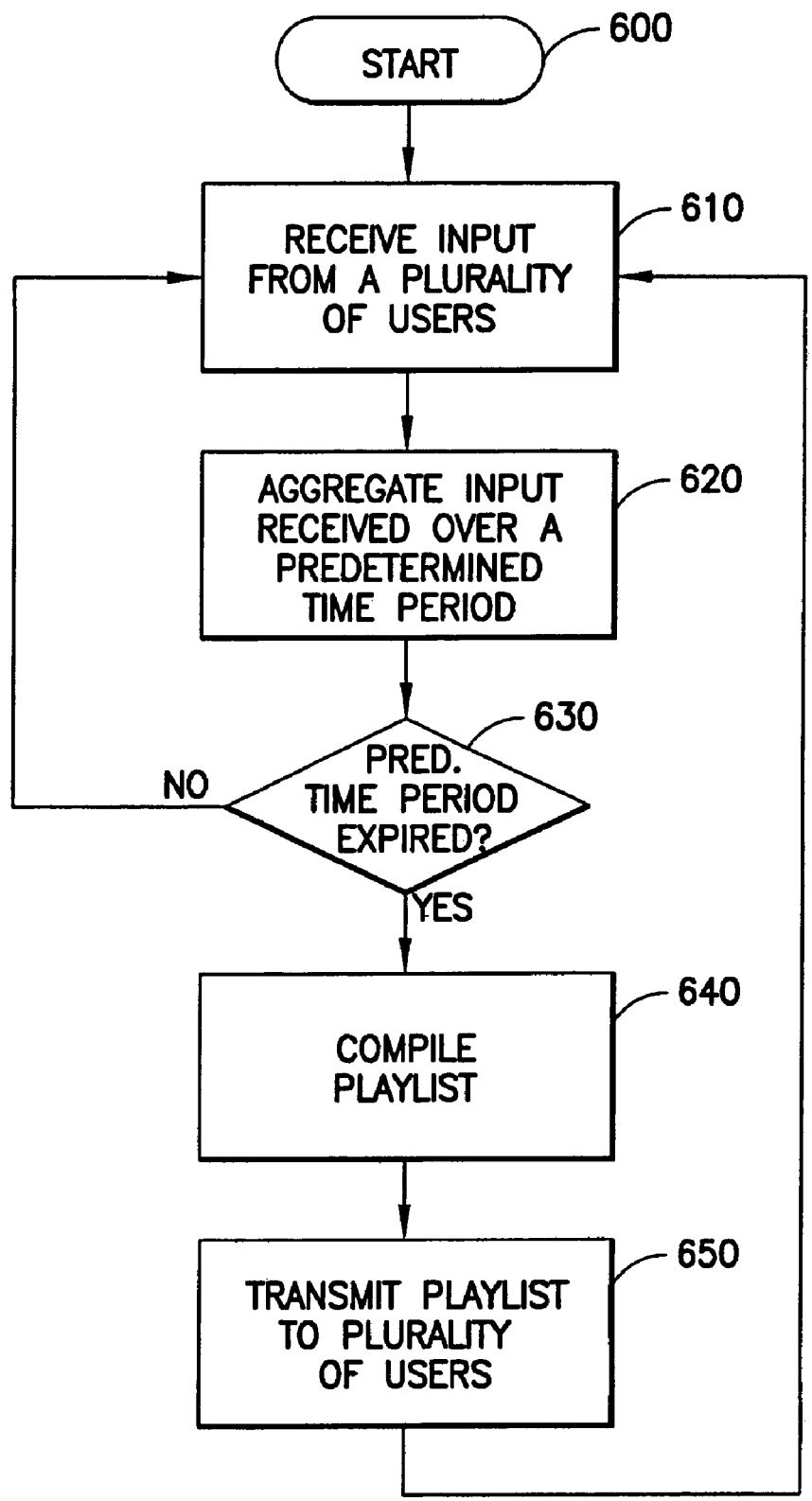
FIG. 5 is a flow diagram of an exemplary method of compiling a playlist in accordance with an embodiment of the present invention.

Referring next to FIG. 5, a method of compiling a playlist and transmitting the playlist to a user in accordance with the present invention will now be discussed. A user may request a song or artist via one of the Web pages provided by the Web server 214 (see, e.g., FIGS. 4h-j and 4l). Start. Step 600. Each user request is received by the station server 212. Step 610. The station server 212 aggregates requests from the users listening to the radio station over a predetermined time period. Step 620. When the predetermined time period has expired, step 630, the station server 212 compiles a playlist. Step 640. When the playlist is completed, the station server 212 transmits the playlist to each user listening to the radio station. Step 650. After a playlist is transmitted to the users, the station server 212 begins to aggregate user requests for songs, step 610, and repeats the method depicted in FIG. 5 and described above. That method is carried out independently for each radio station.

In an alternative embodiment, the inventive method may be carried out using steps 620, 630 and 650 of FIG. 5. Such a method may be used to compile a playlist and provide content to a user based upon input received from a plurality of users. No filtering is carried out in accordance with this embodiment, and the playlist is merely the aggregated user input.

The method carried out by the station server 212 to compile a playlist (step 640 in FIG. 5) will now be discussed in detail. A component or part of the station server 212, which shall be referred to herein as the selection engine 1040 (see, e.g., FIG. 7), considers each song in the song database 222 for the particular radio station, and assigns a score for each song. The score may be based on certain predetermined criteria which may be determined and changed by a system administrator, for example. The score may range from zero to infinity, or have a range from negative to positive, for example, and each criteria may have a predetermined weight as an indication of that criteria's importance (as may be selected or determined by a system administrator, for example). Weighting the various criteria may be done in any manner, using any rational, as a routine matter of design choice. For example, one criteria for scoring each song may be how many users have requested that song since the last time it was played or included on a playlist. Another criteria may be how many times the song was requested over a predetermined time period (e.g., week, month, etc.). Yet another criteria may be the number of requests received for the song for the station. Other criteria may include how users rated a particular song, or the frequency with which a song has been played. For example, if a song was just played or included on a playlist in the last hour (the hour before the selection engine 1040 began to consider each song in the database), or played in some other predetermined time period (e.g., three hours), that fact may provide a negative rating. It may be desirable to ensure that each song is not played too often. On the other hand, if the song has not been played for more than a predetermined time period, that fact may provide for a positive rating.

Other criteria for scoring each song may include the extent to which a particular song's designated genre matches the genre of a particular station. For example, each song in the song database 222 (and each station) may be associated with one or more classifications or genres, such as, for example, "hard rock," or "smooth jazz." If a particular song is classified as "hard rock," it may receive a relatively low rating for a "smooth jazz" station, even if the particular song receives a relatively large number of requests from listeners of that station, because the genre of the song has been determined not to match the genre of that station. In addition, songs and/or stations may be associated with more than one genre such that broader play lists and/or "cross-over" songs may be played on a particular station.

Each song in the song database 222 is considered by the selection engine 1040 and assigned a score that may be the sum of the values assigned to the various criteria. The songs in the song database 222 are thus sorted and arranged according to the scores assigned by the selection engine 1040. In an embodiment of the present invention, the songs with the highest scores may be added to or become part of the playlist. However, before a playlist is finalized, each song being considered for the playlist is run through a filter (e.g., a Digital Millennium Copyright Act ("DMCA") filter) to determine whether the song can be played and with what frequency the song may be played. In embodiments of the invention, a filter may have characteristics such that a station may play songs while also being in compliance with the DMCA or other legislation or licenses related thereto. If a song may not be added to the playlist because of restrictions imposed by the filter, the selection engine 1040 determines the next time that song may be added to the playlist, and records that information so the song need not be considered by the selection engine 1040 or filtered until the song is eligible for inclusion on a playlist.

The selection engine 1040 thus considers each song in the song database 222 (and that process is carried out independently for each radio station) until a complete playlist is compiled. The number of songs that comprise a playlist is a routine matter of design choice. In an embodiment of the present invention, a playlist preferably includes enough songs to fill up the predetermined amount of time between transmission of playlists by the station server 212 (e.g., one hour worth of songs).

The selection engine 1040 need not consider every song in the song database 222 when compiling a playlist. For example, if a song has been added to the playlist, another song by the same artist need not be considered for that playlist. The selection engine 1040 may thus bypass songs of artists that have already been added to the current playlist.

In the above-described embodiments of the present invention, various computer hardware and software have been described in various configuration and combination. It will be obvious to a person of ordinary skill in that art that such description is provided as illustrative of the embodiments of the present invention, and that the present invention need not be limited to those computer hardware and software configurations and combinations, so long as the functionality of the present invention, as described in detail herein, is provided. For example, the station server 212, Web server 214 and ad server 16 are described herein as part of the radio station server 200. Each server may alternatively be provided as a separate computing device with associated software to provide the desired functionality in accordance with the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of providing content to a user over a network comprising the steps of:
    (a) transmitting a current playlist to the user over a first time period having a start time and an end time, the current playlist having been previously compiled;
    (b) determining a user input time period; the user input time period having a start time at or after the first time period's start time and an end time at or before said first time period's end time, said user input time period being a single predetermined time period;
    (c) collecting, by a station server computer, input from the user during said user input time period, the input being content desired by the user over the network;
    (d) compiling, by the station server computer, a new content playlist based on the collected user input received during the user input time period, said new content playlist being compiled subsequent to expiration of said user input time period; and
    (e) transmitting the new content playlist to each of a plurality of users.

2. A method as recited by claim 1, wherein each of the plurality of users has a computer having a media player installed thereon and operable in connection with a processor thereof, and wherein said method further comprises the step of providing computer software code to each of the plurality of users for receiving a plurality of Web pages and for receiving the content playlist, the computer software causing the media player to request and receive each of the plurality of content in the content playlist.

3. A method as recited by claim 1, further comprising filtering the content prior to including it in the new content playlist and prior to transmitting the new content playlist to each of the plurality of users, said filtering determining whether content may be added to the new content playlist in accordance with content license restrictions.

4. A method as recited by claim 1, wherein said step (d) comprises compiling a new content playlist having a predetermined play duration.

5. A method as recited by claim 4, wherein the predetermined play duration is equal to or less than one hour.

6. A method as recited by claim 4, wherein the predetermined play duration is equal to or greater than one hour.

7. A method as recited by claim 1, wherein the content is a plurality of songs and wherein the new content playlist comprises a plurality of unique identifiers for each of the plurality of songs in the new content playlist.

8. A method as recited by claim 7, wherein each of said plurality of unique identifiers includes a url identifying a location from which each of the plurality of songs may be streamed to each of the plurality of users.

9. A method as recited by claim 7, wherein the content is also an advertisement and wherein the new content playlist further comprises a unique identifier for the advertisement.

10. A method as recited by claim 9, wherein each of said unique identifiers for the advertisement includes a url identifying a location from which the advertisement may be streamed to each of the plurality of users.

11. A method as recited by claim 1, wherein said step (e) comprises simultaneously transmitting the new content playlist to each of the plurality of users.

12. A method as recited by claim 1, wherein said step (e) comprises transmitting the new content playlist to each of the plurality of users for automatic playback by each user.

13. A method as recited by claim 1, wherein each user input is a user request for a song.

14. A method as recited by claim 1, further comprising the step of continuously performing steps (b) through (e).

15. A method as recited by claim 1, wherein said step (d) is carried out upon expiration of the predetermined time period of said step (b).

16. A method as recited by claim 1, further comprising:
transmitting to each of the plurality of users information regarding an item of content requested by a requesting user; and
providing each of the plurality of users a link for communicating with the requesting user.

17. A method of providing content to a user based upon input received from a plurality of users, said method comprising the steps of:
(a) determining a user input time period; the user input time period having a start time at or after a first time period's start time and an end time at or before said first time period's end time, said user input time period being a single predetermined time period;
(b) aggregating, by a station server computer, during said user input time period, user input received from the plurality of users in connection with a playlist provided over said first time period;
(c) compiling, by the station server computer, a new content playlist based on the aggregated user input, said new content playlist being compiled subsequent to expiration of said user input time period; and
(d) transmitting said new content playlist to each of the plurality of users.

18. A method as recited by claim 17, wherein each input from the plurality of users is a user request for a song.

19. A method as recited by claim 17, further comprising the step of continuously performing steps (b) through (d).

20. A method as recited by claim 17, wherein said step (c) is carried out upon expiration of the predetermined time period of said step (a).

21. A method as recited by claim 17, wherein said first time period has a duration that is variable.

22. A method as recited by claim 17, wherein the first time period has a duration that is equal to or less than one hour.

23. A method as recited by claim 17, wherein the first time period has a duration that is equal to or greater than one hour.

24. A method as recited by claim 17, wherein the new content playlist comprises a plurality of unique identifiers for identifying each of a plurality of songs.

25. A method as recited by claim 24, wherein each of said plurality of unique identifiers includes a url identifying a location from which each of the plurality of songs may be streamed to the user.

26. A method as recited by claim 24, wherein the new content playlist also comprises a unique identifier for identifying an advertisement.

27. A method as recited by claim 26, wherein said unique identifier for identifying the advertisement includes a url identifying a location from which the advertisement may be streamed to the user.

28. A method as recited by claim 17, wherein said step (d) comprises simultaneously transmitting said new content playlist to each of the plurality of users.

29. A method as recited by claim 17, wherein said step (d) comprises transmitting said new content playlist to each of the plurality of users for automatic playback by each user.

30. A method as recited by claim 17, further comprising:
transmitting to the user information regarding an item of content provided in step (b) requested by a requesting user; and
providing the user a link for communicating with the requesting user.

31. A system for compiling a playlist of a plurality of content and for providing the playlist to a user having a computer connectable to a network, said system being connectable to the network and comprising:
a server having a processor operable in connection with software loaded on said server for:
providing over a network to each of a plurality of users, each user having a user computer, a plurality of Web pages and a current content playlist, the current content playlist having been previously compiled, the current content playlist being provided over a first time period, the first time period having a start time and an end time;
receiving a plurality of inputs from each or the plurality of users via one or more of the plurality of Web pages, each input being related to specific content;
aggregating the plurality of inputs for the same specific content over a predetermined time period, the predetermined time period having a start time at or after the first time period's start time and an end time at or before the first time period's end time, said aggregating ending with expiration of the predetermined time period;
compiling a new content playlist based on the aggregated input from the plurality of users, said new content playlist being determined upon expiration of the predetermined time period, the predetermined time period being a single predetermined time period, and the content included in the new content playlist is determined using the user input received in the single predetermined period of time; and
transmitting the new content playlist to the user.

32. A system as recited by claim 31, wherein said system further comprises a content server connectable to the network, said content server providing content to the user based on the content playlist.

33. A system as recited by claim 31, wherein said processor is further operable in connection with the software on said server for providing computer software code to each of the plurality of users for receiving a plurality of Web pages and for receiving the content playlist, the computer software causing a media player on each user's computer to request and receive each of the plurality of content in the content playlist.

34. A system as recited by claim 32, wherein said processor is further operable in connection with the software on said server for providing computer software code to each of the plurality of users for receiving a plurality of Web pages and for receiving the content playlist, the computer software causing a media player on each user's computer to request and receive each of the plurality of content in the content playlist from said content server.

35. A system as recited by claim 31, wherein said processor is further operable in connection with the software on said server for compiling the new content playlist comprising a plurality of unique identifiers for identifying each of a plurality of songs.

36. A system as recited by claim 35, wherein each of said plurality of unique identifiers includes a url identifying a location from which each of the plurality of songs may be streamed to the user.

37. A system as recited by claim 35, wherein the new content playlist also comprises a unique identifier for identifying an advertisement.

38. A system as recited by claim 37, wherein said unique identifier for identifying the advertisement includes a url identifying a location from which the advertisement may be streamed to the user.

39. A system as recited by claim 31, wherein said server has a data storage device and wherein said system further comprises a plurality of databases stored on said data storage device.

40. A system as recited by claim 39, wherein said plurality of databases include a song database, a user database, and a station database.

41. A system as recited in claim 31, wherein the server is effective to transmit to the user information regarding an item of content requested by a requesting user; and provide each of the plurality of users a link for communicating with the requesting user.

42. A method of providing audio content over a network to a user comprising the steps of:

(a) providing a plurality of Web pages to the user and a current content playlist the current content playlist having been previously compiled, the current content playlist being provided over a first time period, the first time period having a start time and an end time;

(b) receiving a plurality of requests for audio content from a plurality of users via one or more of the plurality of Web pages;

(c) aggregating, by a station server computer, the plurality of requests for audio content over a predetermined time period, the predetermined time period having a start time at or after the first time period's start time and an end time at or before the first time period's end time, said aggregating ending with expiration of the predetermined time period;

(d) compiling, by the station server computer, a new content playlist of certain of the plurality of requested audio content based on the aggregated plurality of requests, said new content playlist being determined upon expiration of the predetermined time period, the predetermined time period being a single predetermined time period, and the content included in the new content playlist is determined using the requests received from the plurality of users in the single predetermined period of time; and (e) transmitting the new content playlist to the user.

43. A method as recited by claim 42, wherein the user has a computer having a media player installed thereon and operable in connection with a processor thereof, and wherein said method further comprises the step of providing computer software code to the user for receiving the new content playlist and for causing the media player to request and receive each of the audio content on the new content playlist.

44. A method as recited by claim 42, wherein the audio content is a plurality of songs and wherein the new content playlist comprises a plurality of unique identifiers for each of the plurality of songs in the playlist.

45. A method as recited by claim 44, wherein each unique identifier includes a url identifying a location from which each of the plurality of songs may be streamed to the user.

46. A method as recited by claim 44, wherein the audio content is also an advertisement and wherein the new content playlist further comprises a unique identifier for the advertisement.

47. A method as recited by claim 46, wherein said unique identifier for the advertisement includes a url identifying a location from which the advertisement may be streamed to each of the plurality of users.

48. A method as recited by claim 42, wherein said step (e) comprises simultaneously transmitting the new content playlist to a plurality of users.

49. A method as recited by claim 42, wherein said step (e) comprises transmitting the new content playlist to a plurality of users for automatic playback by each user.

50. A method as recited by claim 42, further comprising the step of continuously performing steps (b) through (e).

51. A method as recited by claim 42, further comprising:

transmitting to the user information regarding an item of audio content requested by a requesting user; and providing the user a link for communicating with the requesting user.

\* \* \* \* \*